(12) United States Patent
Yim

(10) Patent No.: US 10,191,649 B2
(45) Date of Patent: Jan. 29, 2019

(54) MOBILE TERMINAL AND CONTROL METHOD THEREOF INCLUDING TURNING OFF A DISPLAY IN RESPONSE TO SPECIFIC USER INPUTS

(71) Applicant: LG ELECTRONICS INC., Seoul (KR)

(72) Inventor: Soyeon Yim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 330 days.

(21) Appl. No.: 14/925,652

(22) Filed: Oct. 28, 2015

(65) Prior Publication Data

US 2016/0364109 A1   Dec. 15, 2016

(30) Foreign Application Priority Data

Jun. 15, 2015  (KR) .................. 10-2015-0084480

(51) Int. Cl.
*G06F 3/0488*   (2013.01)
*G06F 3/0484*   (2013.01)
(Continued)

(52) U.S. Cl.
CPC ............ *G06F 3/0488* (2013.01); *G06F 3/048* (2013.01); *G06F 3/0481* (2013.01);
(Continued)

(58) Field of Classification Search
CPC ...... G06F 3/048; G06F 3/0481; G06F 3/0483; G06F 3/0484; G06F 3/0488;
(Continued)

(56) References Cited

U.S. PATENT DOCUMENTS

2009/0154900 A1* 6/2009 Hung ............... G11B 19/02
                                                   386/353
2010/0279675 A1* 11/2010 Slack ............... G06F 9/4843
                                                   455/419

(Continued)

FOREIGN PATENT DOCUMENTS

CA     2899958 A1      8/2014
EP     2341417 A1 *   7/2011 ............. G06F 3/048

OTHER PUBLICATIONS

LG G2 User Guide, published Apr. 24, 2014 and retreived from www.lg.com on Oct. 11, 2017.*

(Continued)

*Primary Examiner* — Aaron Lowenberger
(74) *Attorney, Agent, or Firm* — Birch, Stewart, Kolasch & Birch, LLP

(57) ABSTRACT

A mobile terminal including a body; a touch screen disposed on a front surface of the body, and having a touch panel and a display unit; and a controller configured to display a home screen page or an application execution screen on the touch screen in response to the display unit being turned on, turn off the display unit and execute a lock mode requiring input of a password, in response to a plurality of touch inputs being consecutively received on a preset region of the home screen page, and turn off the display unit and not execute the lock mode, in response to a plurality of touch inputs being consecutively received on a preset region of the application execution screen.

13 Claims, 19 Drawing Sheets

(51) Int. Cl.
*G06F 3/0483* (2013.01)
*G06F 3/0481* (2013.01)
*H04M 1/725* (2006.01)
*G06F 3/048* (2013.01)
*G06F 21/31* (2013.01)
*H04W 12/08* (2009.01)
*H04W 88/02* (2009.01)

(52) U.S. Cl.
CPC .......... *G06F 3/0483* (2013.01); *G06F 3/0484* (2013.01); *G06F 3/04883* (2013.01); *G06F 21/31* (2013.01); *H04M 1/72577* (2013.01); *H04W 12/08* (2013.01); *H04W 88/02* (2013.01)

(58) Field of Classification Search
CPC    G06F 3/04883; G06F 21/31; H04M 1/72577; H04W 88/02
See application file for complete search history.

(56) References Cited

U.S. PATENT DOCUMENTS

| | | | |
|---|---|---|---|
| 2011/0029869 A1* | 2/2011 | McLennan | G06F 3/017 |
| | | | 715/702 |
| 2013/0194067 A1* | 8/2013 | Kimbrell | G06F 21/31 |
| | | | 340/5.54 |
| 2014/0289683 A1* | 9/2014 | Park | G06F 3/0488 |
| | | | 715/863 |
| 2015/0004938 A1* | 1/2015 | Nagata | H04M 1/67 |
| | | | 455/411 |
| 2015/0121228 A1* | 4/2015 | Lee | H04L 67/025 |
| | | | 715/727 |
| 2015/0199102 A1* | 7/2015 | Koh | G06F 3/0488 |
| | | | 715/835 |
| 2015/0253973 A1* | 9/2015 | Chiu | G06F 3/04847 |
| | | | 715/752 |

OTHER PUBLICATIONS

Baladad, Mike, "Put Your Galaxy S3's Screen to Sleep Just by Double-Tapping the Display", Apr. 11, 2014, retreived from https://gs3.gadgethacks.com/how-to/put-your-galaxy-s3s-screen-sleep-just-by-double-tapping-display-0154279/ on Oct. 11, 2017.*
Dennis, "Lock/Unlock Your Android Device Without the Power button—No Root Required!," XP055316095, Nov. 24, 2014, retrieved from http://www.makeuseof.com/tag/lock-unlock-android-device-power-button-broken/, pp. 1 of 6-6 of 6.
LG Electronics, "LG H950 Support: Manuals, Warranty & More: LG U.S.A," XP055311206, May 27, 2015, retrieved from http://www.lg.com/us/support-mobile/lg-H950-Platinum-Silver, pp. 1 of 5-5 of 5.
LG Electronics, "LG-H950 (LG G flex 2) User guide," XP055311209, May 27, 2015, pp. 1-132.
Srilekha et al., "A Secure Screen Lock System for Android Smart Phones using Accelerometer Sensor," International Journal of Science Technology & Engineering, vol. 1, Iss. 10, Apr. 2015, XP055312172, pp. 96-100.
TECH2 News Staff, "AirDroid 3 mirrors your Android smartphone on your PC," XP055313264, Dec. 5, 2014, retrieved from http://tech.firstpost.com/news-analysis/airdroid-3-mirrors-your-android-smartphone-on-your-pc-244604.html, pp. 1 of 4-4 of 4.
Whitney, "Android users can now lock their lost devices remotely," XP055314035, Sep. 24, 2013, retrieved from https://www.cnet.com/news/android-users-can-now-lock-their-lost-devices-remotely/, pp. 1 of 3-3 of 3.

* cited by examiner

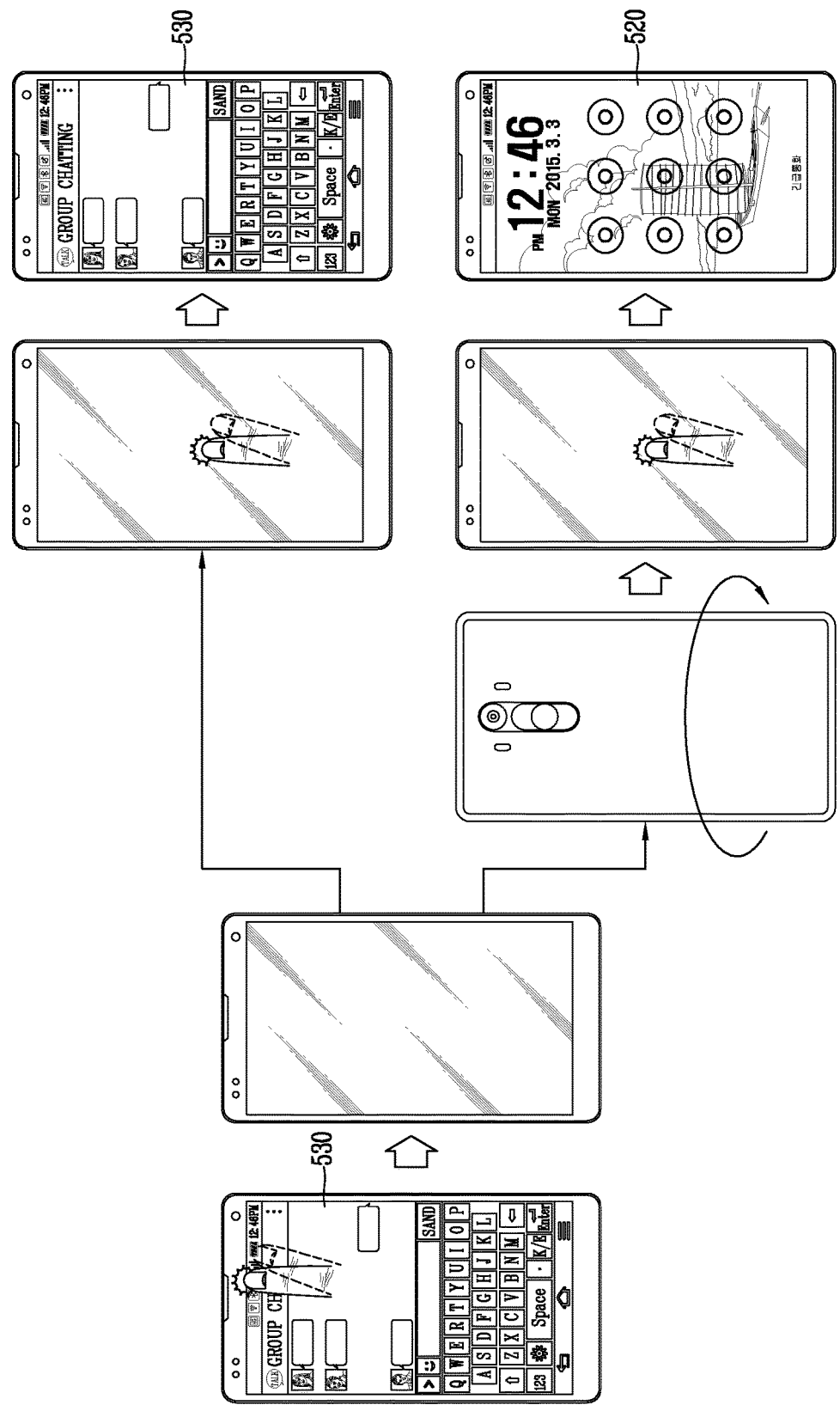

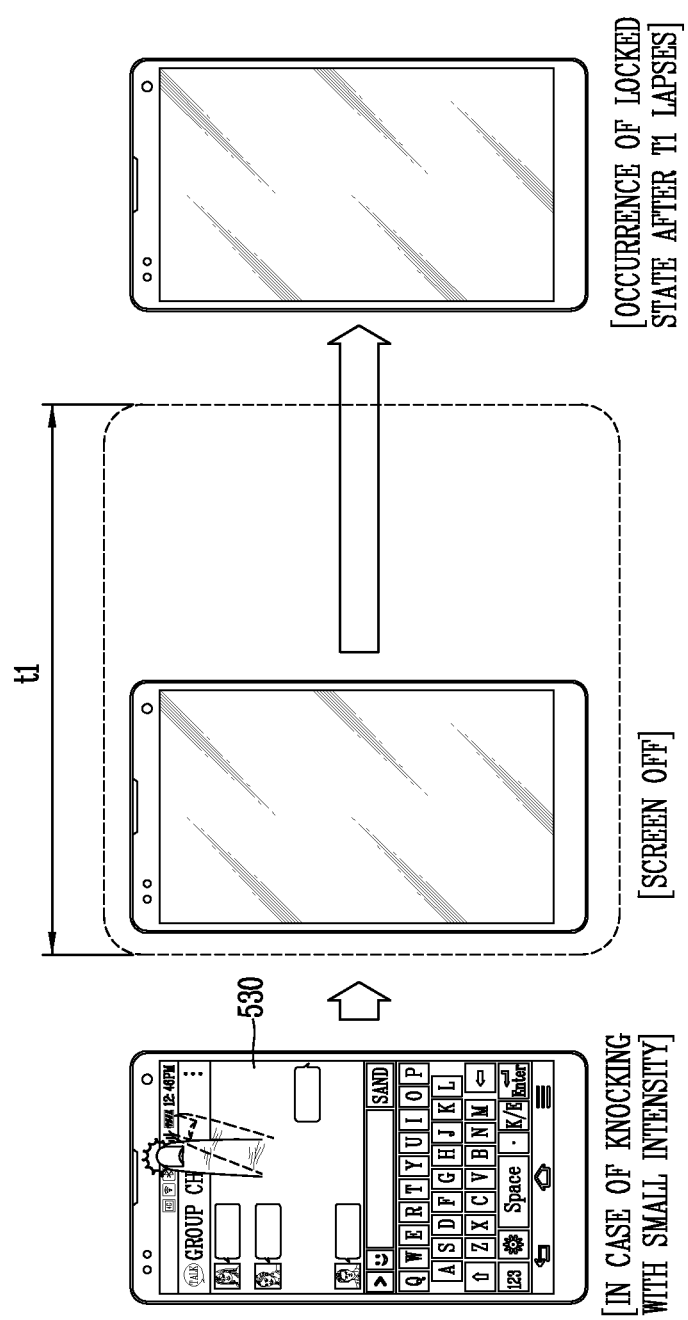

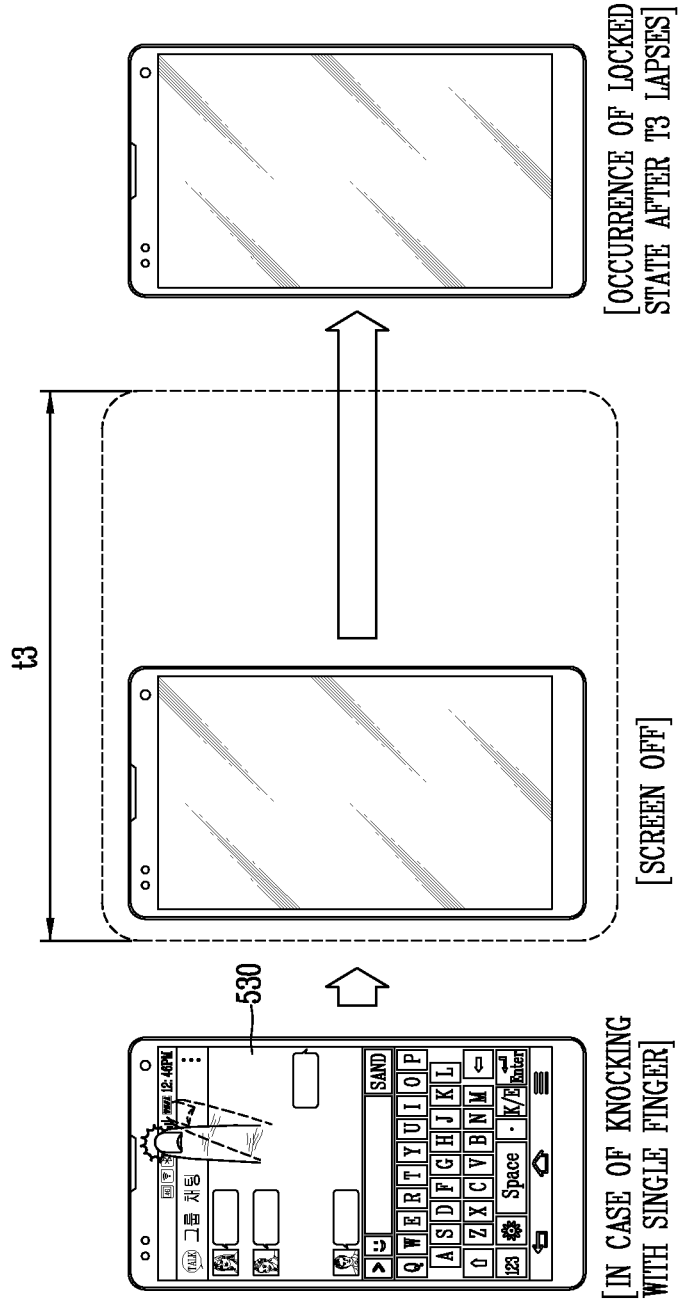

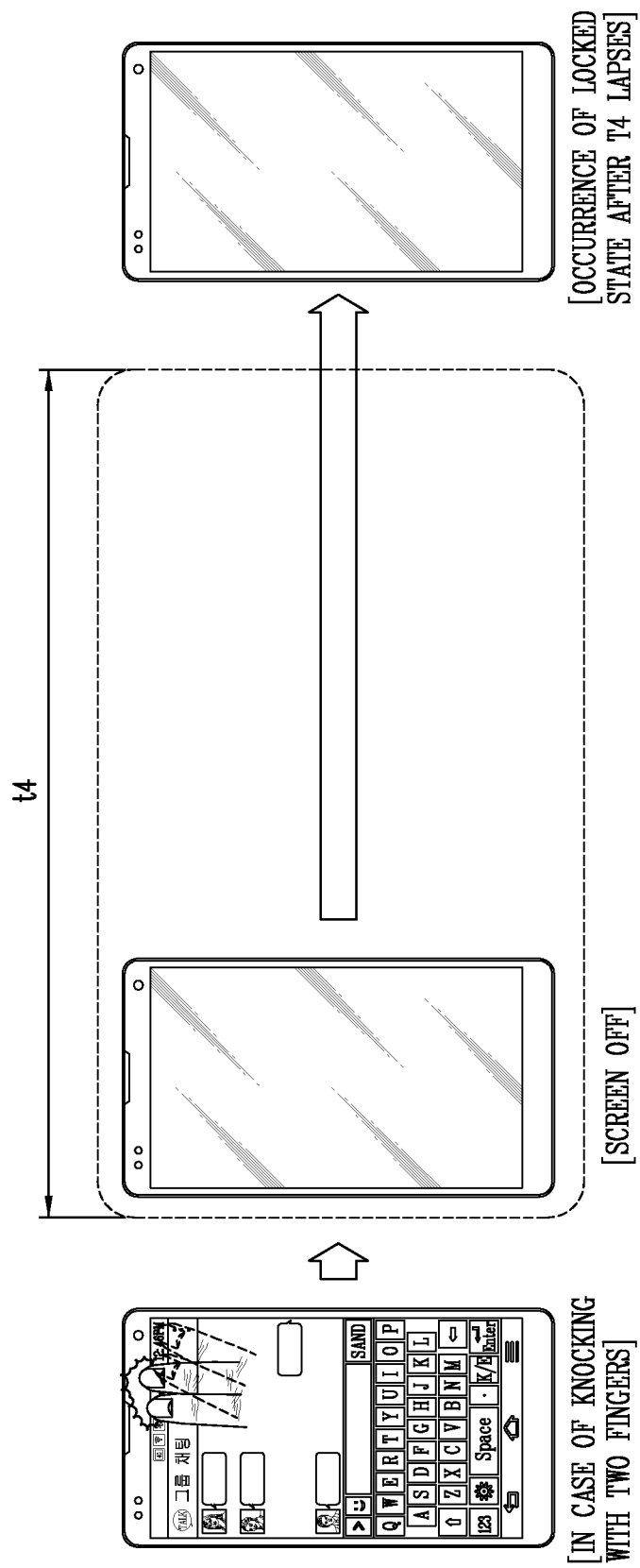

MOBILE TERMINAL AND CONTROL METHOD THEREOF INCLUDING TURNING OFF A DISPLAY IN RESPONSE TO SPECIFIC USER INPUTS

CROSS-REFERENCE TO RELATED APPLICATION

Pursuant to 35 U.S.C. § 119(a), this application claims the benefit of earlier filing date and right of priority to Korean Application No. 10-2015-0084480, filed on Jun. 15, 2015, the contents of which is incorporated by reference herein in its entirety.

BACKGROUND OF THE INVENTION

1. Field of the Invention

The present invention relates to a mobile terminal, and more particularly, to a mobile terminal having a display unit configured to be turned on/off, and a control method thereof.

2. Background of the Invention

In general, a terminal may be classified into a mobile (portable) terminal and a stationary terminal according to a moveable state. The mobile terminal may be also classified into a handheld terminal and a vehicle mount terminal according to a user's carriage method. As functions of the terminal become more diversified, the terminal can support more complicated functions such as capturing images or video, reproducing music or video files, playing games, receiving broadcast signals, and the like. By comprehensively and collectively implementing such functions, the mobile terminal may be embodied in the form of a multimedia player or a device. Various attempts have been made to implement complicated functions in such a multimedia device by means of hardware or software.

Further, demands for a new user interface capable of simply controlling functions of the mobile terminal using a user's gesture are increased.

SUMMARY OF THE INVENTION

Therefore, an aspect of the detailed description is to provide a mobile terminal capable of turning off a display unit which is in an 'on' state according to a user's request, and capable of simultaneously and selectively executing a lock mode for inputting a password according to the user's request, and a control method thereof.

Another aspect of the detailed description is to provide a mobile terminal capable of controlling an execution screen being output therefrom, to be displayed on an external terminal, and a control method thereof. That is, another aspect of the detailed description is to provide an interface for a user to consecutively execute a task being executed in a first terminal, in a second terminal. In this instance, output from the first terminal is stopped or terminated such that unnecessary consumption of a battery of the first terminal is prevented.

To achieve these and other advantages and in accordance with the purpose of this specification, as embodied and broadly described herein, there is provided a mobile terminal, including: a body; a touch screen disposed on a front surface of the body, and having a touch panel and a display unit; and a controller configured to control the touch screen such that a home screen page or an execution screen by execution of an application is output when the display unit is turned on, wherein the controller is configured to turn off the display unit and execute a lock mode requiring input of a password, if a plurality of touch inputs are consecutively received on a preset region of the home screen page, and wherein the controller is configured to turn off the display unit but not to execute the lock mode, if a plurality of touch inputs are consecutively received on a preset region of the execution screen.

According to another aspect of the present invention, there is provided a mobile terminal, including: a body; a band connected to the body, and formed to be wearable on a wrist; a touch screen disposed on a front surface of the body, and including a touch panel and a display unit; and a controller configured to control the touch screen such that a watch screen or an execution screen by execution of an application is output when the display unit is turned on, wherein the controller is configured to turn off the display unit, if a plurality of touch inputs are consecutively received on a preset region of the watch screen, and wherein the controller is configured to control the touch screen such that the watch screen is output, if a plurality of touch inputs are consecutively received on a preset region of the execution screen.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 6 is a conceptual view illustrating a mobile terminal which selectively executes a lock mode in an 'off' state of a display unit;

FIGS. 7A, 7B, 8A and 8B are conceptual views illustrating a mobile terminal which sets a predetermined time for executing a lock mode, based on a user's gesture;

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another. When an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
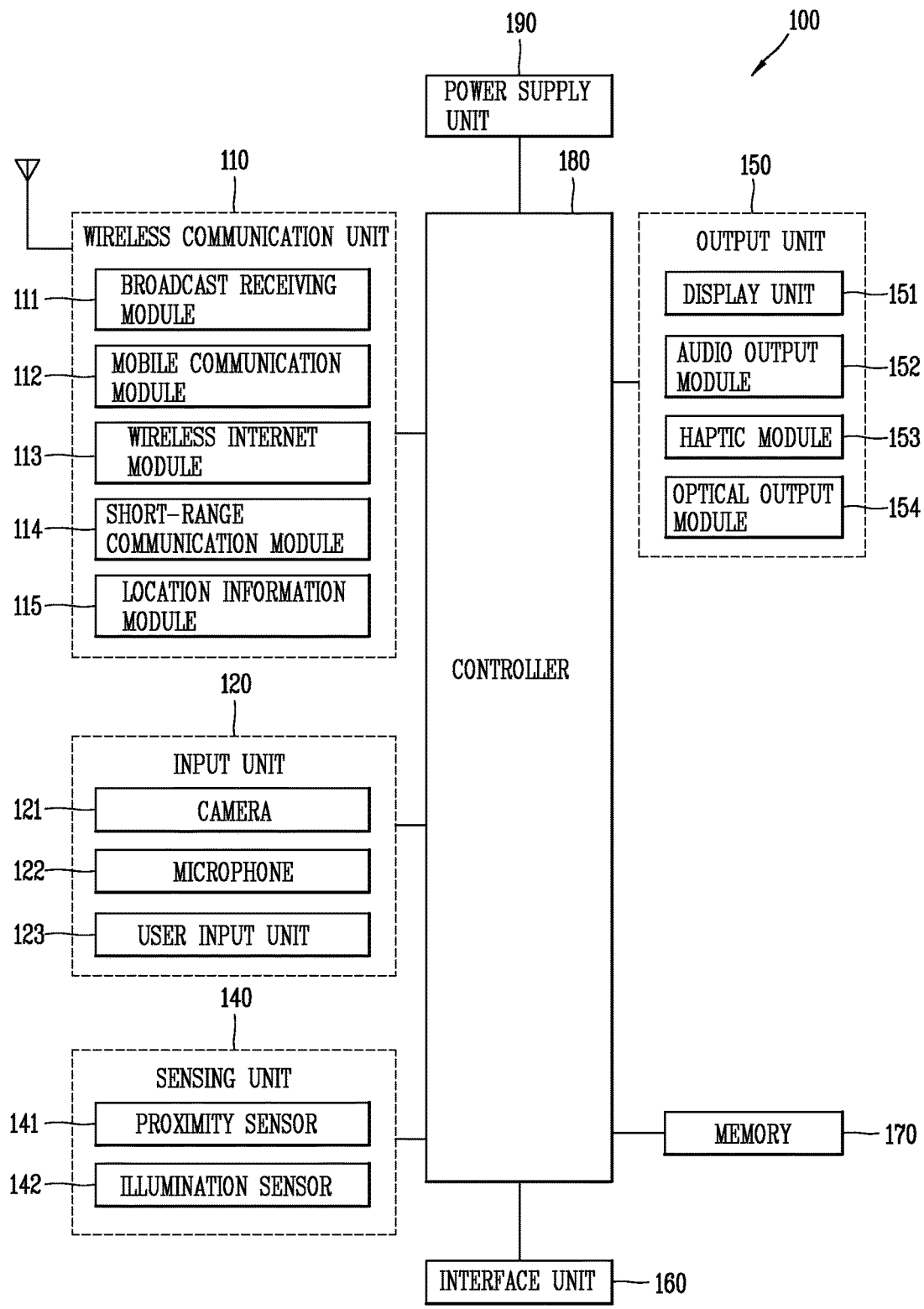
FIG. 1A is a block diagram illustrating a mobile terminal according to an embodiment of the present invention.
Figure 1B:
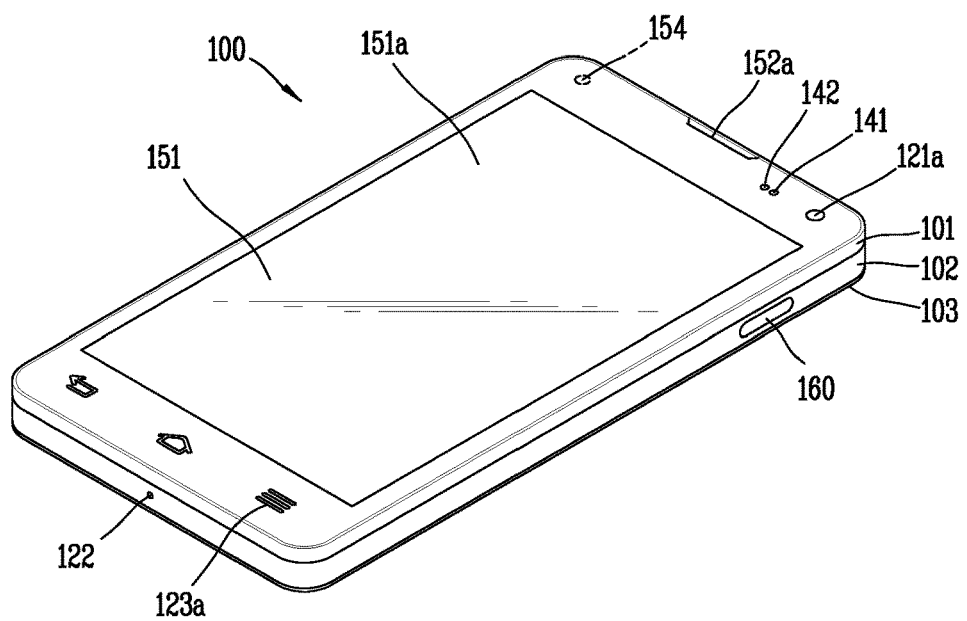
FIGS. 1B and 1C are conceptual views illustrating an example of a mobile terminal according to an embodiment of the present invention, which are viewed from different directions.
Figure 1C:
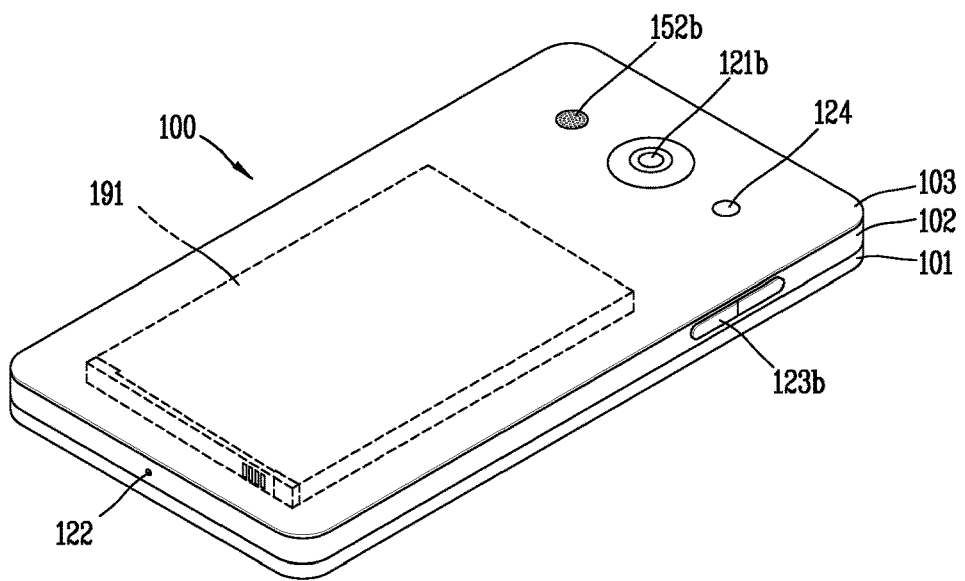

Reference is now made to FIGS. 1A-1C, where FIG. 1A is a block diagram of a mobile terminal in accordance with the present disclosure, and FIGS. 1B and 1C are conceptual views of the mobile terminal, viewed from different directions. The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 can be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 can perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-IC according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the body, or configured to be detachable from the body.

At least some of the above components may operate in a cooperating manner, so as to implement an operation or a control method of a glass type terminal according to various embodiments to be explained later. The operation or the control method of the glass type terminal may be implemented on the glass type terminal by driving at least one application program stored in the memory 170.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies. Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen.

Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen. The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like. The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 can include message reception, call signal reception, a missed call, an alarm, a schedule notice, an email reception, information reception through an application, and the like. A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen. The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 can also be operated in relation to a network storage device that performs the storage function of the memory 170 over a network, such as the Internet.

The controller 180 can typically control the general operations of the mobile terminal 100. For example, the controller 180 can set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the body for charging. The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type body. However, the mobile terminal 100 can alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the body to output information. As illustrated, a window 151*a* of the display unit 151 may be mounted to the front case 101 to form the front surface of the body together with the front case 101. In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121*b* or an audio output module 152*b*.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 can be configured such that one case forms the inner space. In this example, a mobile terminal 100 having a uni-body is formed so synthetic resin or metal extends from a side surface to a rear surface.

If desired, the mobile terminal 100 can include a waterproofing unit for preventing introduction of water into the body. For example, the waterproofing unit may include a waterproofing member which is located between the window 151*a* and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, alternative arrangements are possible and within the teachings of the instant disclosure. Some components may be omitted or rearranged. For example, the first manipulation unit 123*a* may be located on another surface of the body, and the second audio output module 152*b* may be located on the side surface of the body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof. The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a. The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170. The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the body. As one example, the rear input unit may be located on an upper end portion of the rear side of the body such that a user can easily manipulate it using a forefinger when the user grabs the body with one hand. Alternatively, the rear input unit can be positioned at most any location of the rear side of the body.

Embodiments that include the rear input unit may implement some or all of the functionality of the first manipulation unit 123a in the rear input unit. As such, in situations where the first manipulation unit 123a is omitted from the front side, the display unit 151 can have a larger screen. As a further alternative, the mobile terminal 100 can include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject. As shown in FIG. 1C, the second audio output module 152b can be located on the body. The second audio output module 152b may implement stereophonic sound functions in conjunction with the first audio output module 152a, and may be also used for implementing a speaker phone mode for call communication.

At least one antenna for wireless communication may be located on the body. The antenna may be installed in the body or formed by the case. For example, an antenna which configures a part of the broadcast receiving module 111 may be retractable into the body. Alternatively, an antenna may be formed using a film attached to an inner surface of the rear cover 103, or a case that includes a conductive material.

A power supply unit 190 for supplying power to the mobile terminal 100 can include a battery 191, which is mounted in the body or detachably coupled to an outside of the body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 can be provided. The cover or pouch may cooperate with the display unit 151 to extend the function of the mobile terminal 100. Another example of the accessory is a touch pen for assisting or extending a touch input to a touch screen.

Figure 2:
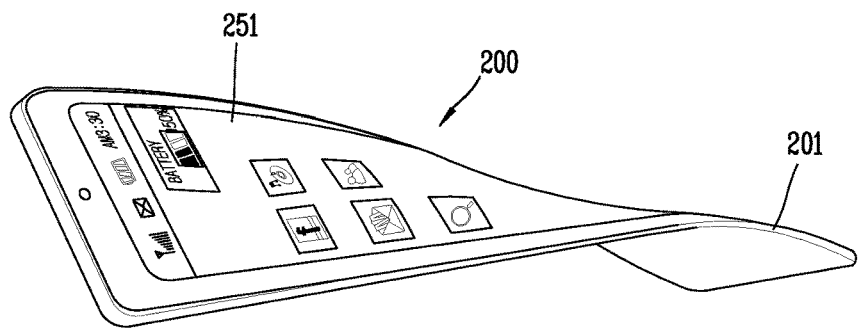
FIG. 2 is a conceptual view illustrating a modification example of a mobile terminal according to an embodiment of the present invention.

FIG. 2 is a conceptual view of a deformable mobile terminal 200 according to an alternative embodiment of the present invention. In this figure, the mobile terminal 200 is shown having a display unit 251, which is a type of display that is deformable by an external force. This deformation, which includes display unit 251 and other components of mobile terminal 200, may include any of curving, bending, folding, twisting, rolling, and combinations thereof. The deformable display unit 251 may also be referred to as a "flexible display unit." In some implementations, the flexible display unit 251 may include a general flexible display, electronic paper (also known as e-paper), and combinations thereof. In general, mobile terminal 200 may be configured to include features that are the same or similar to that of mobile terminal 100 of FIGS. 1A-1C.

The flexible display of mobile terminal 200 is generally formed as a lightweight, non-fragile display, which still exhibits characteristics of a conventional flat panel display, but is instead fabricated on a flexible substrate which can be deformed as noted previously. The term e-paper may be used to refer to a display technology employing the characteristic of a general ink, and is different from the conventional flat panel display in view of using reflected light. E-paper is generally understood as changing displayed information using a twist ball or via electrophoresis using a capsule.

When the flexible display unit 251 is not deformed (for example, in a state with an infinite radius of curvature and referred to as a first state), a display region of the flexible display unit 251 includes a generally flat surface. When the flexible display unit 251 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized so a light emission of each unit pixel (sub-pixel) arranged in a matrix configuration is controlled independently. The unit pixel denotes an elementary unit for representing one color.

According to one alternative embodiment, the first state of the flexible display unit 251 may be a curved state (for example, a state of being curved from up to down or from right to left), instead of being in flat state. In this embodiment, when an external force is applied to the flexible display unit 251, the flexible display unit 251 may transition to the second state such that the flexible display unit is deformed into the flat state (or a less curved state) or into a more curved state.

If desired, the flexible display unit 251 may implement a flexible touch screen using a touch sensor in combination with the display. When a touch is received at the flexible touch screen, the controller 180 can execute certain control corresponding to the touch input. In general, the flexible touch screen is configured to sense touch and other input while in both the first and second states.

One option is to configure the mobile terminal 200 to include a deformation sensor which senses the deforming of the flexible display unit 251. The deformation sensor may be included in the sensing unit 140. The deformation sensor may be located in the flexible display unit 251 or the case 201 to sense information related to the deforming of the flexible display unit 251. Examples of such information related to the deforming of the flexible display unit 251 may be a deformed direction, a deformed degree, a deformed position, a deformed amount of time, an acceleration that the deformed flexible display unit 251 is restored, and the like. Other possibilities include most any type of information which can be sensed in response to the curving of the flexible display unit or sensed while the flexible display unit 251 is transitioning into, or existing in, the first and second states.

In some embodiments, controller 180 or other component can change information displayed on the flexible display unit 251, or generate a control signal for controlling a function of the mobile terminal 200, based on the information related to the deforming of the flexible display unit 251. Such information is typically sensed by the deformation sensor. The mobile terminal 200 is shown having a case 201 for accommodating the flexible display unit 251. The case 201 can be deformable together with the flexible display unit 251, taking into account the characteristics of the flexible display unit 251.

A battery located in the mobile terminal 200 may also be deformable in cooperation with the flexible display unit 261, taking into account the characteristic of the flexible display unit 251. One technique to implement such a battery is to use a stack and folding method of stacking battery cells.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 can sense or recognize a wearable device that is near-enough to communicate with the mobile terminal. In addition, when the sensed wearable device is a device which is authenticated to communicate with the mobile terminal 100, the controller 180 can transmit data processed in the mobile terminal 100 to the wearable device via the short-range communication module 114, for example. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Figure 3:
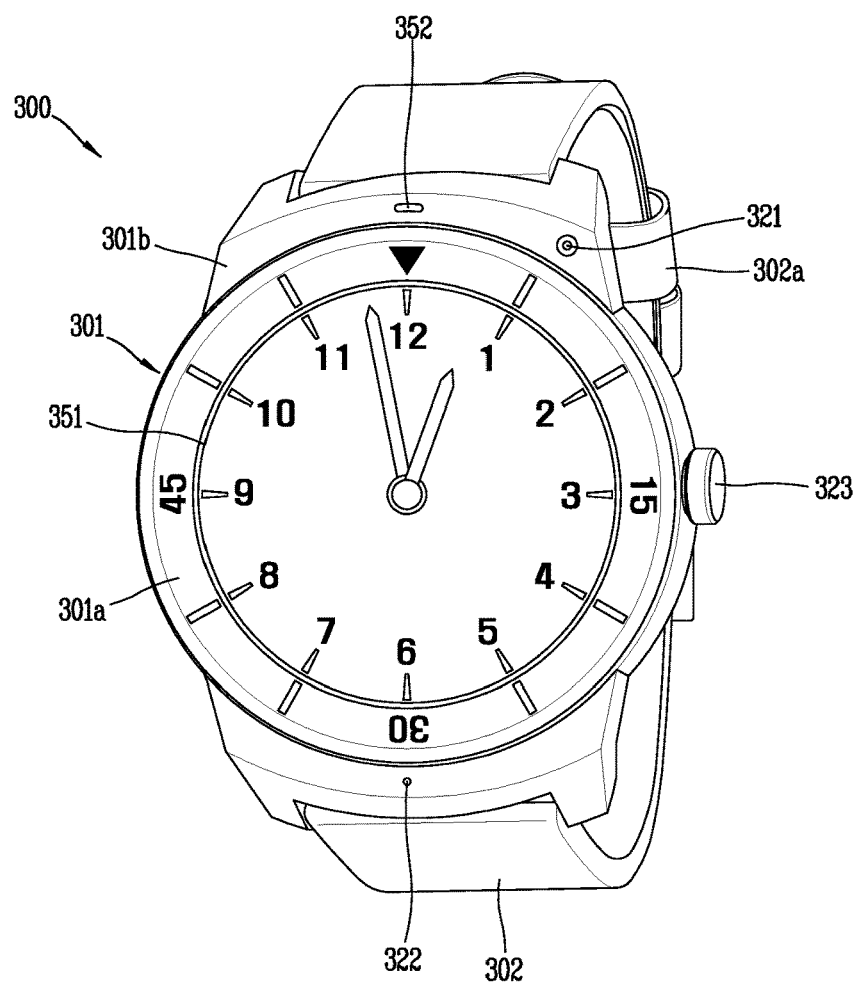
FIG. 3 is a perspective view of a watch-type mobile terminal according to another embodiment of the present invention, which shows an example of a wearable device.

FIG. 3 is a perspective view illustrating one example of a watch-type mobile terminal 300 in accordance with another exemplary embodiment. As illustrated in FIG. 3, the watch-type mobile terminal 300 includes a main body 301 with a display unit 351 and a band 302 connected to the main body 301 to be wearable on a wrist. In general, mobile terminal 300 may be configured to include features that are the same or similar to that of mobile terminal 100 of FIGS. 1A-IC.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touch screen. As illustrated, window 351a is positioned on the first case 301a to form a front surface of the body together with the first case 301a.

The illustrated embodiment includes audio output module 352, a camera 321, a microphone 322, and a user input unit 323 positioned on the main body 301. When the display unit 351 is implemented as a touch screen, additional function keys may be minimized or eliminated. For example, when the touch screen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band may include therein a ground extending portion electrically connected to the antenna to extend a ground area. The band 302 may include fastener 302a. The fastener 302a may be implemented into a buckle type, a snap-fit hook structure, a Velcro® type, or the like, and include a flexible section or material. The drawing illustrates an example that the fastener 302a is implemented using a buckle.

In the mobile terminal according to an embodiment of the present invention, one or more functions being executed or executable in the mobile terminal may be controlled based on a tap gesture applied to (knocking on) an object. Thus, a user may control the one or more functions by a simple gesture to knock on an object, without applying an additional input (e.g., touch input) for control of the one or more functions, to the mobile terminal.

Figure 4:
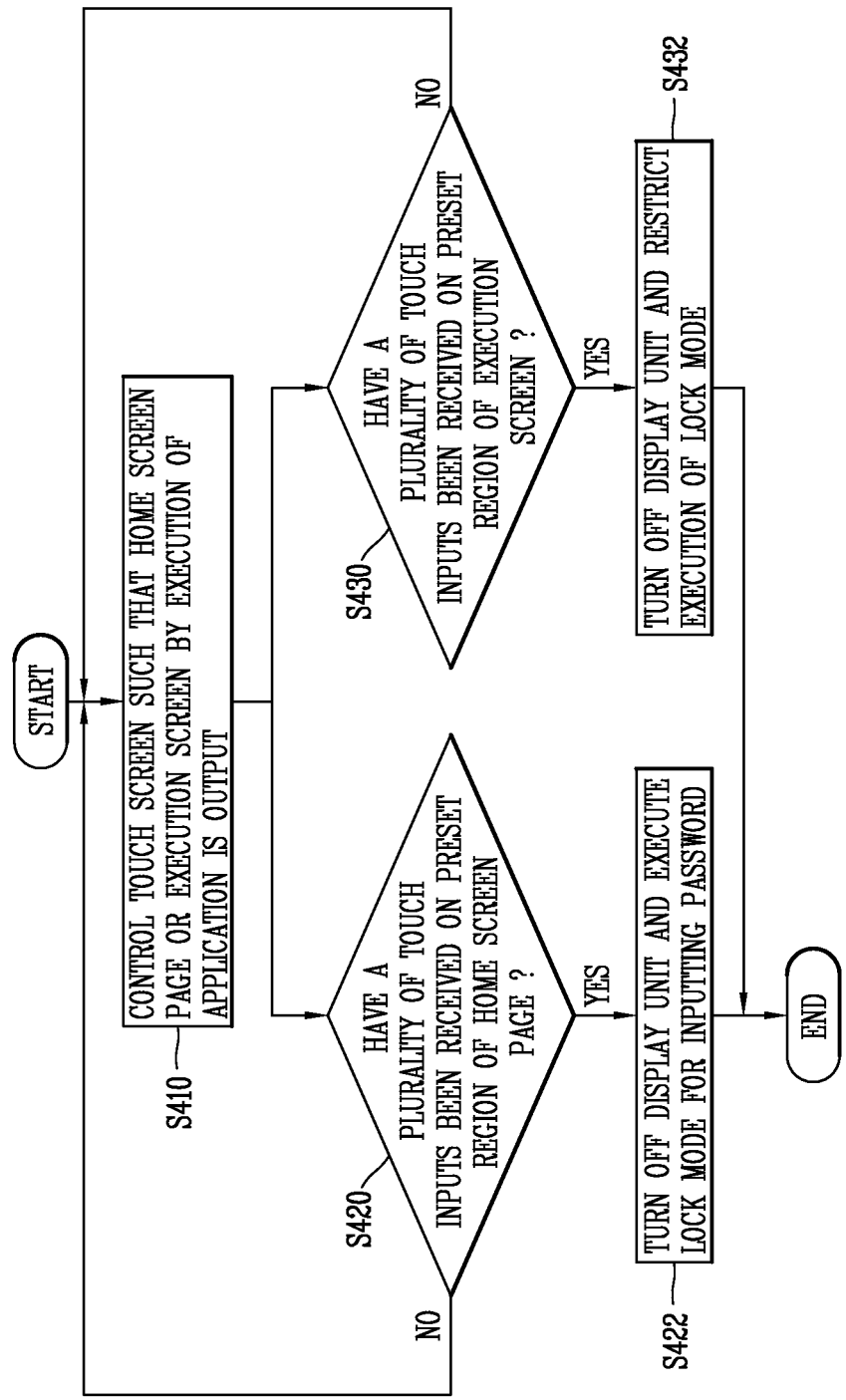
FIG. 4 is a flowchart illustrating a method of controlling a mobile terminal according to an embodiment of the present invention.
Figure 5A:
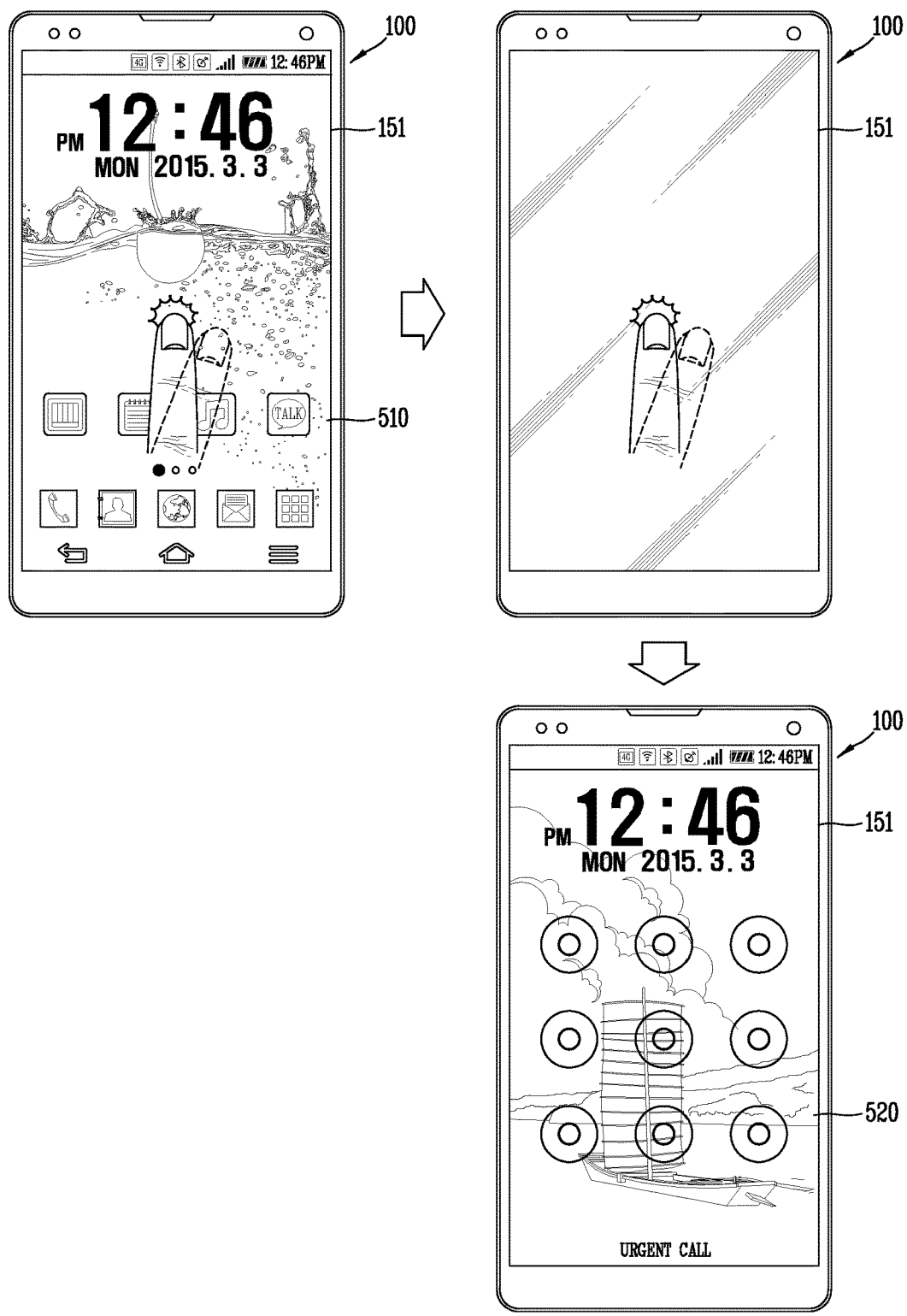
FIGS. 5A to 5C are conceptual views illustrating the control method of FIG. 4.
Figure 5B:
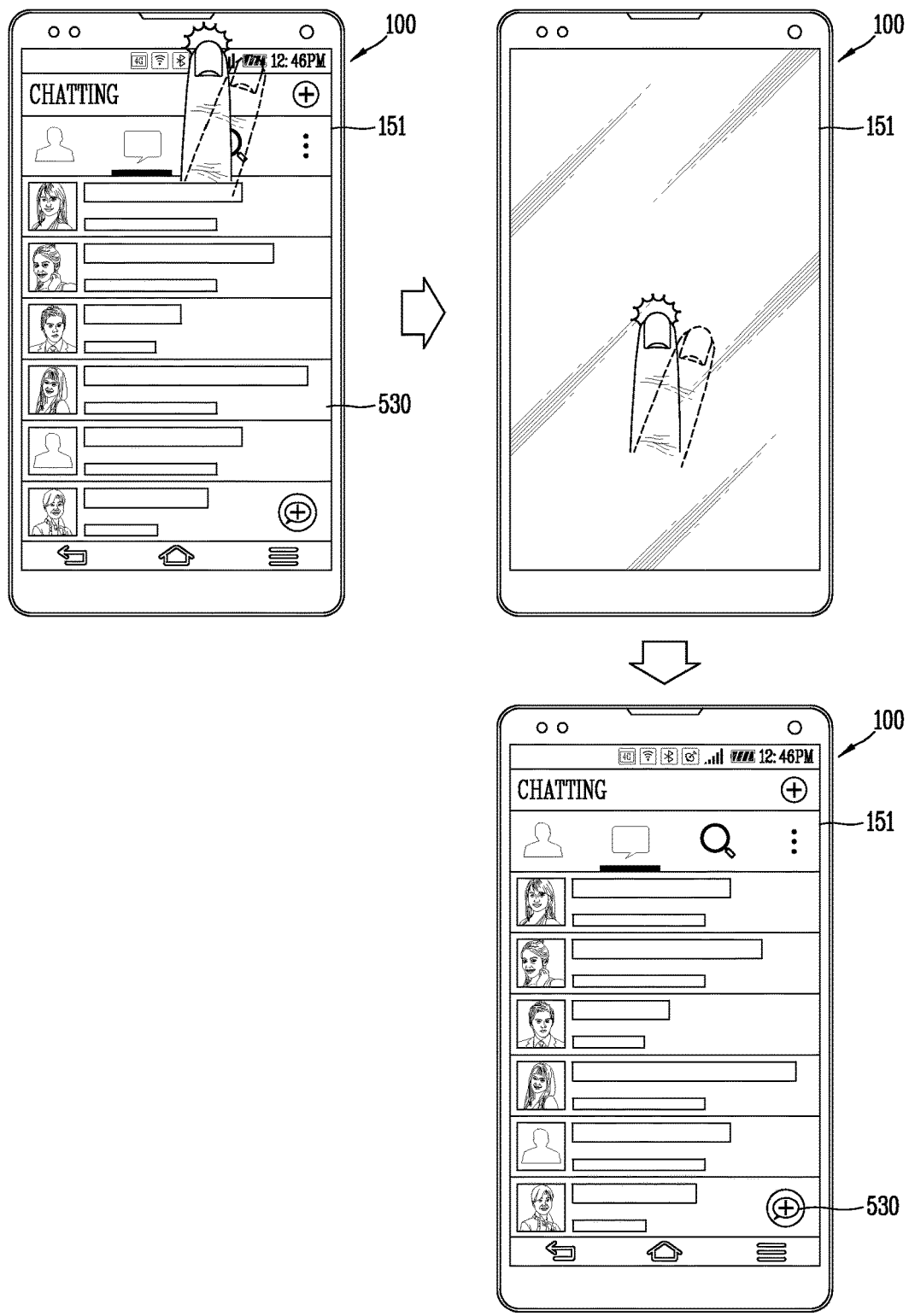
Figure 5C:
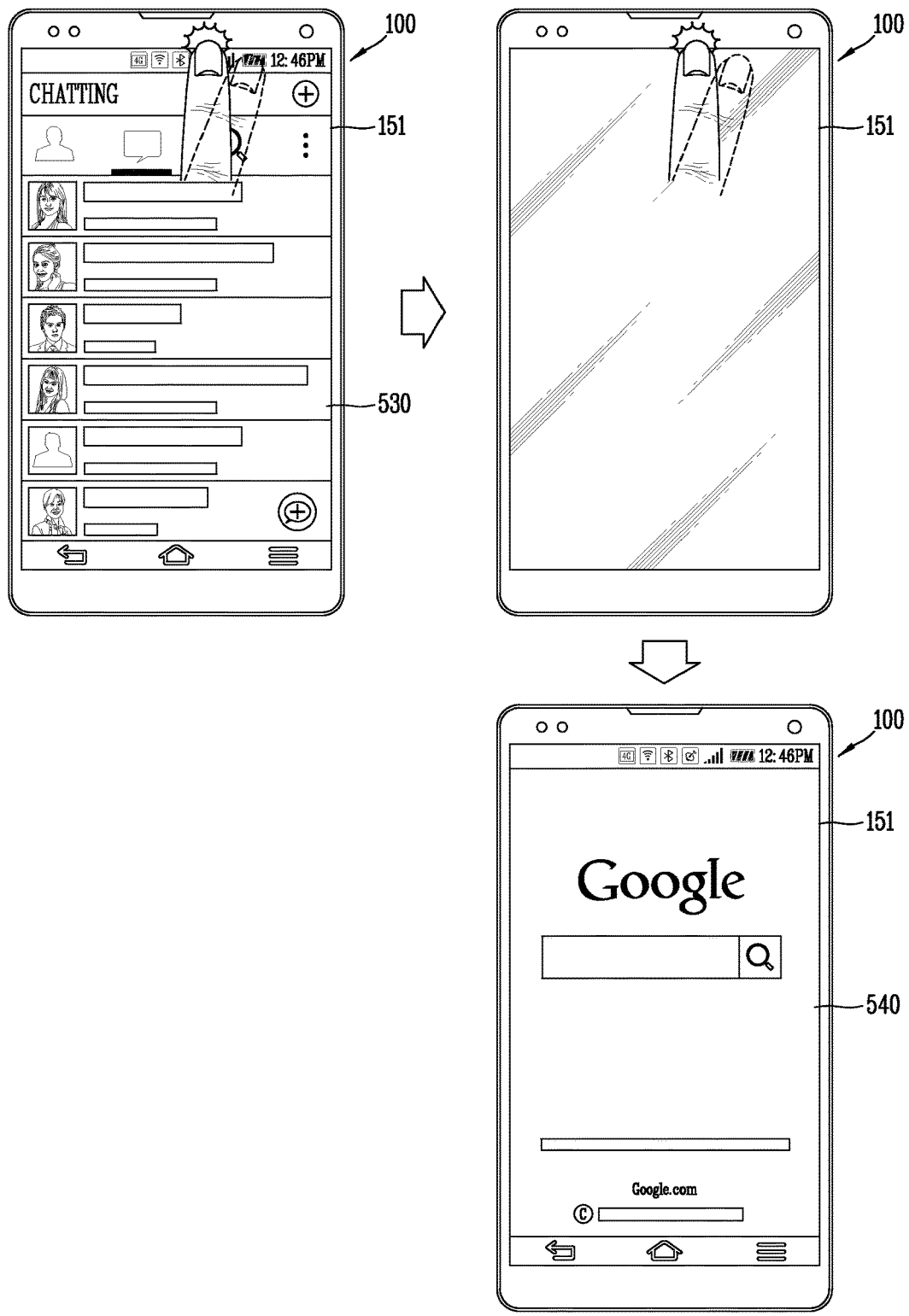

Hereinafter, a mobile terminal capable of providing a new user interface based on a tap gesture to knock on an object, and a method of controlling the mobile terminal will be explained in more detail with reference to the attached drawings. FIG. 4 is a flowchart illustrating a method of controlling a mobile terminal according to an embodiment of the present invention, and FIGS. 5A to 5C are conceptual views illustrating the control method of FIG. 4.

The mobile terminal 100 includes the touch screen 151 and the controller 180 aforementioned in FIG. 1A. The touch screen 151 includes a display unit 151a configured to output visual information, and a touch panel 151b configured to sense a touch input. The display unit 151a is formed to be turned on/off, and is configured to output visual information when turned on and to terminate the output of the visual information when turned off. The touch panel 151b is configured to sense a touch input applied to the touch screen 151 regardless of an 'on/off' state of the display unit 151a.

If the display unit 151a is turned on, the controller 180 controls the touch screen 151 such that a home screen page or an execution screen by execution of an application is output (S410). The home screen page may include at least one object, and the object may be an icon of an application installed on the mobile terminal or a widget. The home screen page may include a plurality of pages according to a user's selection, or according to the number of applications installed on the mobile terminal. At least one of the plurality of pages may be output to the touch screen 151 according to a user's selection. Further, the home screen page may include at least one of an identification information region for displaying identification information about a page output to the touch screen 151, a status information region for displaying status information of the mobile terminal 100, and a preset region for displaying an icon of a preset application.

If an execution command for at least one application is received, or if an event is generated from at least one application, the controller 180 controls the touch screen 151 such that an execution screen of the application is output. The execution screen may be output together with at least part of the home screen page, or may be output instead of the home screen page. For convenience, it will be explained hereinafter that the home screen page or the execution screen is selectively output. However, the present invention is not limited to this.

The application includes a widget, a home launcher, or the like, and means all types of programs which can be driven in the mobile terminal. The application may be a program for executing a web browser function, a program for playing moving images, a program for transmitting or receiving (transceiving) messages, a program for managing schedules, or a program for updating an application.

The application includes an execution icon related to the application. If a touch input is applied to the execution icon, or if a voice command is received, the controller 180 executes the application, and outputs a corresponding execution screen to the touch screen 151. An event may be generated when there is a missed call, when there is an application to be updated, when there is a received message, when the mobile terminal is being charged, when the mobile terminal is powered on, when the mobile terminal is powered off when an LCD awake key of the display unit is pressed, when there is an alarm, when there is an incoming call, when there is a missed notification, etc.

A touch input satisfying a preset condition may be applied to the touch screen 151 while the home screen page or the execution screen is being output. The preset condition may be related to at least one of the number of touch inputs applied, a position, a speed, an intensity, a pattern and a region. For instance, when two touch inputs are consecutively applied within a reference time, the controller 180 can determine that a touch input satisfying a preset condition has been applied. That is, the touch input satisfying a preset condition means two or more touch inputs consecutively sensed within a reference time within a predetermined region of the touch screen 151.

The reference time may be a very short time. For instance, the reference time may be within the range of 300 ms~2 s. The predetermined region may be the same region where a plurality of touch inputs have been applied, or a narrow region which can be regarded as the same region. However, the aforementioned reference time and predetermined region may be variously modified according to embodiments.

If a touch input satisfying a preset condition is applied to the mobile terminal when the display unit 151*a* is turned on, the controller 180 can turn off the display unit 151*a*. Generally, a user should press a power button (or user input unit) disposed on a side surface or a rear surface of the body, in order to turn off the display unit 151*a*. When the body is disposed on a desk, the user may have an inconvenience in pressing the power button. The reason is because the user should press the power button after lifting up the body.

In order to solve such a problem, in the mobile terminal 100 of the present invention, when a touch input satisfying a preset condition is applied to the touch screen 151, the display unit 151*a* is turned off. The controller 180 turns off the display unit 151*a* only when a touch input satisfying a preset condition is applied, in order to prevent the display unit 151*a* from being turned off by a user's undesired touch input. Since the display unit 151*a* is turned off as a touch input satisfying a preset condition is applied to the touch screen, a user's convenience is enhanced.

A function to turn off the display unit 151*a* may be executed in association with a lock function for converting the mobile terminal into a locked state. The locked state means a restricted state of input of a control command for an application. If the display unit 151*a* is turned on in the locked state, a lock screen formed to input a password is output. Hereinafter, 'execution of a lock mode' means that a released state is converted into the locked state.

More specifically, when a plurality of touch inputs are consecutively received on a preset region of the home screen page (S420), the controller 180 turns off the display unit 151*a*, and executes a lock mode requiring input of a password (S422). For instance, as shown in FIG. 5A, if a touch input satisfying a preset condition is applied to a preset region of a home screen page 510 while the home screen page 510 is being output, the display unit 151*a* is turned off. In this instance, the lock mode is executed.

If the display unit 151*a* is turned on again, the controller 180 controls the touch screen 151 such that a lock screen 520 formed to input a password is output, because the lock mode is automatically executed. More specifically, if a plurality of touch inputs are consecutively received on the touch screen while the lock mode is being executed in an 'off' state of the display unit 151*a*, the controller 180 controls the display unit 151*a* such that the lock screen 520 formed to input a password is output. The preset region of the home screen page means a region where a graphic object related to a control function is not displayed.

The controller 180 can divide an entire region of the home screen page into a region where a graphic object related to a control function is displayed, and a region where the graphic object is not displayed (or an empty space). The graphic object means a graphic element for executing a preset control function when a touch input is applied to a region where the graphic object is output. For instance, the graphic object may be an icon, a menu, a widget, etc. When a touch input is applied to the graphic object, a control function related to the graphic object should be executed. Thus, the preset region of the home screen page is limited to a region where the graphic object is not displayed.

If the home screen page is composed of a plurality of pages, the region where the graphic object is not displayed is variable according to a page being output to the touch screen 151. When a touch input satisfying a preset condition is applied to a preset region where no graphic object has been output, among the entire region of the home screen page, the controller 180 turns off the display unit 151*a* and executes the lock mode. When a touch input satisfying a preset condition is applied to a preset region where a graphic object has been output, the controller may execute a control function corresponding to the graphic object, or may ignore the touch input satisfying a preset condition.

If a plurality of touch inputs are consecutively received on a preset region of the execution screen (S430), the controller 180 turns off the display unit 151*a* and restricts execution of the lock mode (S432). That is, even if the display unit 151*a* is turned off, the lock mode is not executed. For instance, as shown in FIG. 5B, if a touch input satisfying a preset condition is applied while an execution screen 530 by execution of any application is being output, the display unit 151*a* is turned off. In this instance, the controller 180 restricts execution of the lock mode. That is, the lock mode is not executed.

A preset region of the execution screen is positioned near an upper end of the touch screen 151, and means a region where at least one of antenna information, time information and battery information is output. The region where at least one of antenna information, time information and battery information is output is called a 'status information region'. The execution screen includes the status information region regardless of a type of an application. Thus, a user may turn off the display unit 151a by applying a touch input satisfying a preset condition to the status information region.

If the display unit 151a is turned on again, the controller 180 controls the touch screen 151 such that the execution screen 530 which has been output the most recently, rather than the lock screen 520 is output, because execution of the lock mode is restricted. More specifically, if a plurality of touch inputs are consecutively received on the touch screen 151 in an 'off' state of the display unit 151a and in a non-executed state of the lock mode, the controller 180 controls the display unit 151a such that the execution screen 530 is output.

If the display unit 151a is turned off while the home screen page is being output, a user may not have an intention to consecutively execute a function being currently performed. The reason is because the display unit 151a is turned off when no application is executed. Thus, the lock mode is automatically executed. On the contrary, if the display unit 151a is turned off while the execution screen is being output, a user may have an intention to consecutively execute a function being currently performed. In this instance, if a lock mode is executed, a user has a difficulty in inputting a password. Thus, execution of the lock mode is restricted.

As aforementioned, in the mobile terminal according to an embodiment of the present invention, the display unit which is in an 'on' state may be turned off according to a user's request, and a lock mode requiring input of a password may be selectively executed according to the user's request. Thus, a user may continuously use the existing execution screen without inputting a password, or may turn off the display unit and execute a lock mode.

If a plurality of touch inputs are consecutively received on the touch screen 151, in an 'off' state of the display unit 151a and in a non-executed state of a lock mode, the controller 180 can control the display unit 111a such that different screen information is output based on an applied position of the plurality of touch inputs. That is, if a touch input satisfying a preset condition is applied to the touch screen 151 in a non-executed state of the lock mode, various types of screen information may be displayed according to an applied position of the touch input.

More specifically, the touch screen may be divided into a first region and a second region, and first screen information corresponding to the first region may be output when a touch input satisfying a preset condition is applied to the first region. And second screen information corresponding to the second region may be output when a touch input satisfying a preset condition is applied to the second region.

For instance, an edge region of the touch screen 151 may be set as the first region, and the remaining region except for the edge region may be set as the second region. As shown in FIG. 5C, if a touch input satisfying a preset condition is applied to the first region, an execution screen 540 of a preset application may be output. On the contrary, as shown in FIG. 5B, if a touch input satisfying a preset condition is applied to the second region, the execution screen 530 which has been output the most recently may be output.

Different screen information and corresponding regions may be set according to a user's input. For instance, at least one of a size and a position of the first region, and the first screen information corresponding to the first region may be set or reset by a user. With such a configuration, a user may control the mobile terminal 100 such that his or her desired screen information is immediately output when the display unit 151a is turned on.

FIG. 6 is a conceptual view illustrating the mobile terminal which selectively executes a lock mode in an 'off' state of the display unit. The mobile terminal 100 can automatically execute a lock mode in an 'off' state of the display unit, and in a non-executed state of the lock mode. If a user has no intention to continuously use the mobile terminal 100, the lock mode is automatically executed for prevention of usage of the mobile terminal 100 by a third party.

More specifically, if a predetermined condition is satisfied in an 'off' state of the display unit 151a and in a non-executed state of a lock mode, the controller 180 can execute the lock mode in an 'off' state of the display unit 151a. The predetermined condition may be a state where the body of the mobile terminal 100 is turned over in an 'off' state of the display unit 151a, or a state where the body is put in a bag or a pocket.

The mobile terminal may be further provided with a sensing unit 140 (refer to FIG. 1A) configured to sense the predetermined condition. The controller 180 can determine whether the predetermined condition is satisfied based on a signal generated by the sensing unit 140, and may execute the lock mode according to a determination result.

For instance, the sensing unit 140 may further include a proximity sensor disposed on a front surface of the body and configured to sense an object disposed close to the front surface of the body. If an object is sensed in an 'off' state of the display unit 151a and in a non-executed state of a lock mode, the controller 180 executes the lock mode. That is, when the body is put in a bag or a pocket, the lock mode is immediately executed.

As another example, the sensing unit 140 is configured to sense a movement of the body. If a preset movement of the body is sensed in an 'off' state of the display unit and in a non-executed state of a lock mode, the controller 180 can execute the lock mode. The preset movement of the body may include a case where a front surface of the body toward a first direction is turned over toward an opposite direction to the first direction, a case where the body has moved by a predetermined distance, a case where the body is moved at a predetermined speed, etc. Since the lock mode is automatically executed, the lock screen is output to the display unit 151a when the display unit 151a is turned on.

FIGS. 7A, 7B, 8A and 8B are conceptual views illustrating a mobile terminal which sets a predetermined time for executing a lock mode, based on a user's gesture. If a plurality of touch inputs are consecutively received on a preset region of the execution screen, the controller 180 does not execute a lock mode after turning off the display unit 151a, but executes the lock mode after a predetermined time lapses. That is, execution of the lock mode may be restricted for a predetermined time from a time point when the display unit 151a has been turned off, and the lock mode may be automatically executed after the predetermined time lapses. Hereinafter, the predetermined time is called an 'automatic locking time'.

The automatic locking time may be differently set according to a characteristic of a touch input satisfying a preset condition. For instance, if a touch input satisfying a preset condition includes a first touch input and a second touch input, the characteristic may be related to at least one of an intensity of the first and second touch inputs, a touch area, a type of an object which has applied the first and second touch inputs, and a time interval between the first and second touch inputs.

Figure 7B:
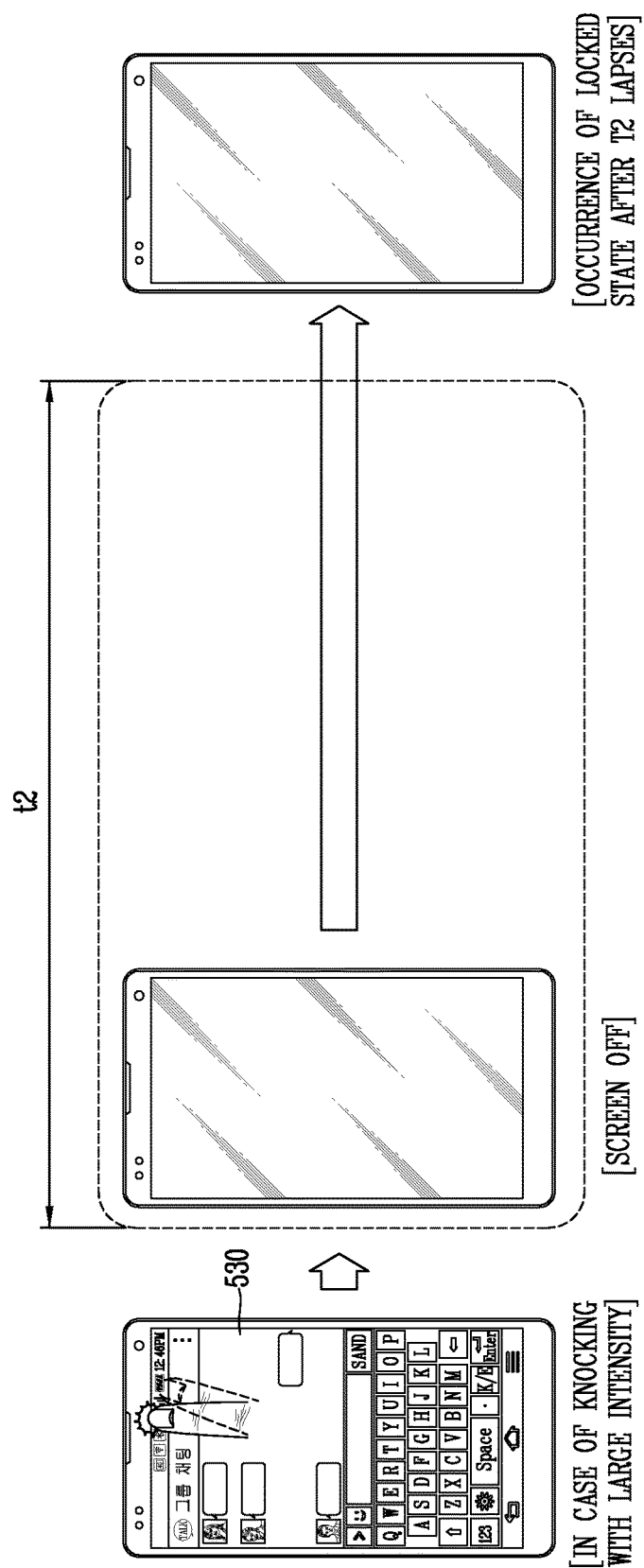

For instance, as shown in FIG. 7A, if the first and second touch inputs are applied with a first intensity, the controller 180 can set the automatic locking time as a first time (t1) corresponding to the first intensity. On the contrary, as shown in FIG. 7B, if the first and second touch inputs are applied with a second intensity, the controller 180 can set the automatic locking time as a second time (t2) corresponding to the second intensity.

As another example, as shown in FIG. 8A, if the first and second touch inputs are applied with a single finger, the controller 180 can set the automatic locking time as a third time (t3) corresponding to the single finger. On the contrary, as shown in FIG. 8B, if the first and second touch inputs are applied with two fingers, the controller 180 can set the automatic locking time as a fourth time (t4) corresponding to the two fingers.

A user may predict a time when to re-use the mobile terminal 100, and may input a touch input corresponding to the predicted time to the mobile terminal 100 such that a lock mode is automatically executed after the predicted time lapses. The characteristic and the corresponding automatic locking time may be set or reset according to a user's input. For instance, at a first automatic locking time corresponding to a first characteristic, the first characteristic may be reset as a second characteristic, or the first automatic locking time may be changed.

Figure 9A:
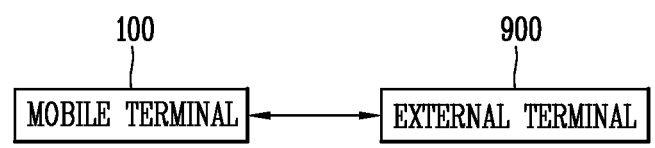
FIGS. 9A to 9E are conceptual views illustrating a mobile terminal which executes communication with an external terminal such that an execution screen is output from the external terminal.

FIGS. 9A to 9E are conceptual views illustrating a mobile terminal which executes communication with an external terminal such that an execution screen is output from the external terminal. Referring to FIG. 9A, the mobile terminal 100 of the present invention may execute communication with an external terminal 900. Further, the mobile terminal 100 can execute communication with the external terminal 900 such that an execution screen being output is output from the external terminal 900 when the display unit 151a is turned off. The mobile terminal 100 and the external terminal 900 may provide an interface to allow a user to continuously execute a task being executed in one terminal, in another terminal. In this instance, output from the one terminal is stopped or terminated so that unnecessary consumption of a battery of the one terminal is prevented.

The mobile terminal 100 can execute communication with various types of external terminals, and may execute pairing with at least one of the external devices. The pairing means connection between the external terminal 900 and the mobile terminal 100, for data transception (transmission and reception).

For the pairing, the external terminal 900 and the mobile terminal 100 can execute data transception in two directions through communication connection. The pairing may be executed through the wireless communication unit 110 (refer to FIG. 1) such as Bluetooth and near field communication (NFC).

The mobile terminal 100 should be prevented from being paired with a user's undesired external terminal. For this, the mobile terminal 100 and the external terminal 900 may execute pairing only when a password set by a user is input to at least one of the mobile terminal 100 and the external terminal 900. The password may be replaced by a fingerprint registered to the mobile terminal 100, a cloud server, etc. Communication between the mobile terminal 100 and the external terminal 900, which is to be explained later, may be executed when the pairing is implemented.

The external terminal 900 may be any type of mobile terminal having at least one of the components shown in FIG. 1A. For convenience, it will be explained that the external terminal 900 is a watch-type mobile terminal aforementioned in FIG. 3. However, the present invention is not limited to this.

Figure 9B:
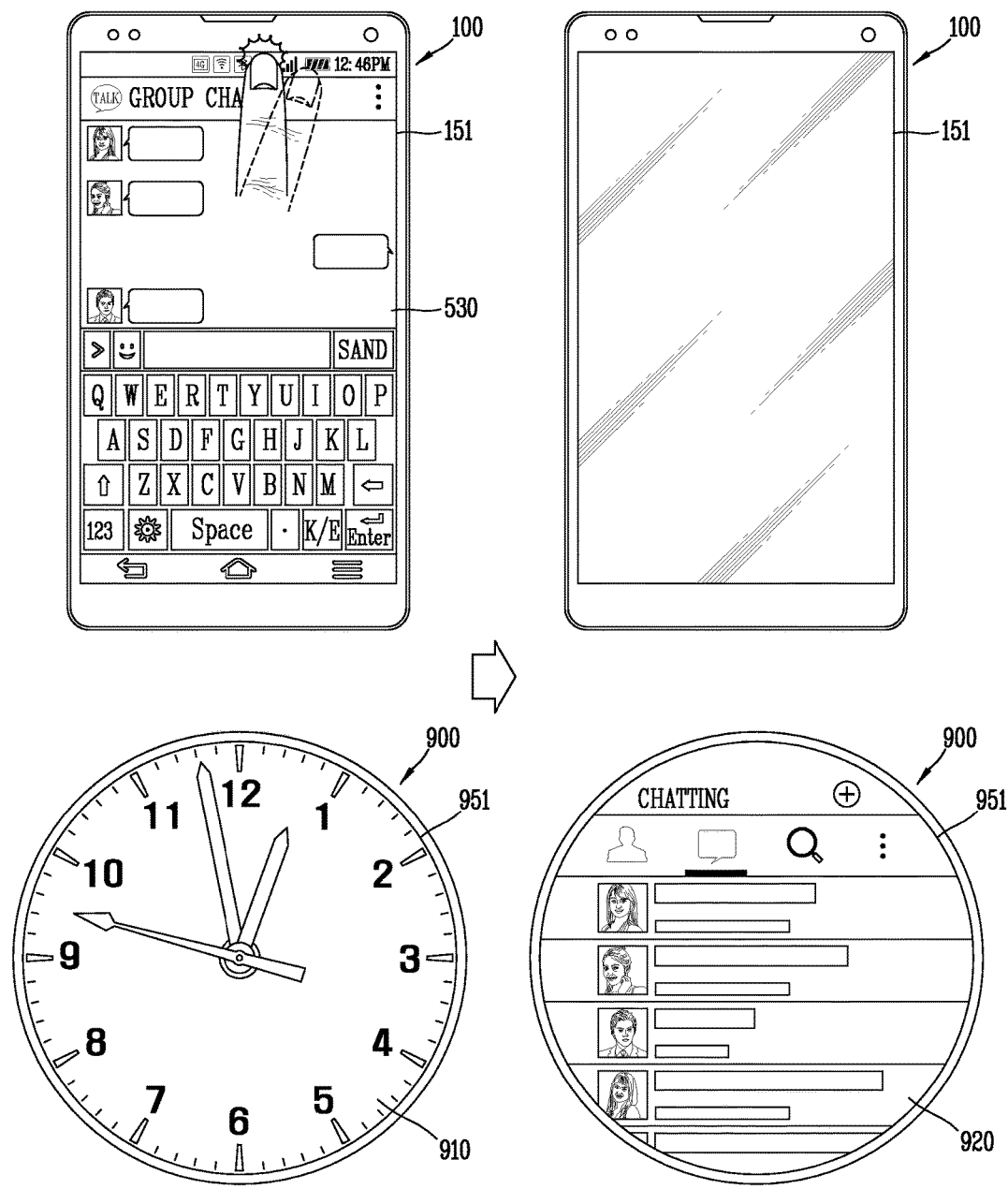

As shown in FIG. 9B, the external terminal 900 may be provided with a touch screen 951, and may output a watch screen 910. The watch screen 910 includes indexes composed of numbers indicating time, an hour hand indicating an index corresponding to an hour according to a time lapse, a minute hand indicating an index corresponding to a minute according to a time lapse, and a second hand indicating an index corresponding to a second according to a time lapse. The indexes, the hour hand, the minute hand, and the second hand may be represented in various forms according to a user's setting.

The external terminal 900 controls the touch screen 951 such that the hour hand and the minute hand indicate a current time according to a time lapse. Thus, a user may check the current time with viewing the touch screen 951 of the external terminal 900, without applying an additional control command.

Upon execution of communication connection, the mobile terminal 100 can transceive (transmit and receive) data with the external terminal 900 in a session-open state. Thus, the mobile terminal 100 can detect an event generated from itself 100 and/or the external terminal 900, and may share information on occurrence of the event with the external terminal 900. With such a configuration, the mobile terminal 100 and the external terminal 900 may be operated in an interworking manner.

More specifically, the mobile terminal 100 can output the execution screen 530 by execution of an application, to the display unit 151a. Further, if a plurality of touch inputs are consecutively received on a preset region of the execution screen 530, and if a last touch input (LT) is maintained for a reference time without being released, the mobile terminal may not execute a lock mode even if the display unit 151a is in an 'off' state. And the mobile terminal may execute communication with the external terminal 900 such that an execution screen 920 of an application is output from the external terminal 900.

If a touch input satisfying a preset condition is input to a preset region of the execution screen 530, the mobile terminal 100 turns off the display unit 151a, but does not execute a lock mode. Further, if a last touch input (LT) among touches included in the touch input satisfying a preset condition is maintained for a reference time without being released, the mobile terminal 100 executes communication with the external terminal 900 such that the execution screen 920 of the application is output from the external terminal 900.

The external terminal 900 controls the touch screen 951 such that the execution screen 920 of the application is output instead of the watch screen 910 being output, through communication with the mobile terminal 100. A user may check that the execution screen 920 of the application is being output from the external terminal 900, and may release the last touch input (LT). Then, the user may continuously use the application using the external terminal 900.

In addition, when the application has not been installed on the external terminal 900, the external terminal 900 may output a web page for downloading the application. When the application cannot be downloaded or driven, the external terminal 900 may output guidance information indicating that the execution screen of the application cannot be output.

If there are a plurality of preset external terminals, the mobile terminal 100 can output graphic objects corresponding to the plurality of preset external terminals, respectively. The graphic object may include at least one of a name of an external terminal paired, and an image indicating a type of the external terminal.

Figure 9C:
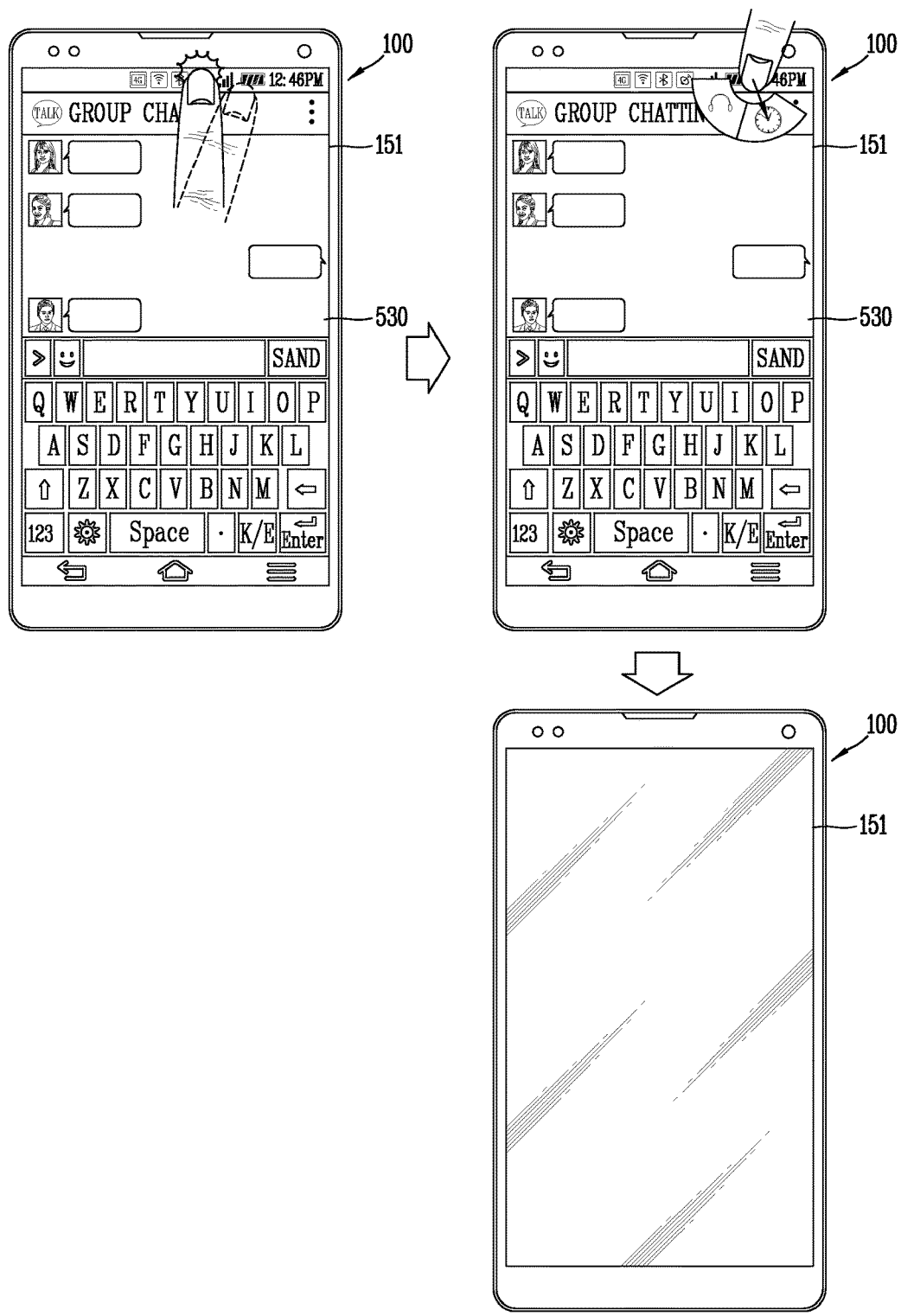

For instance, as shown in FIG. 9C, when the mobile terminal 100 is paired with a first external terminal and a second external terminal, the mobile terminal 100 can output a first graphic object (A) corresponding to the first external terminal, and a second graphic object (B) corresponding to the second external terminal. The display unit 151a maintains an 'on' state, because the first and second graphic objects A and B should be output.

If the last touch input is moved (dragged) to one of the first and second graphic objects A and B, the mobile terminal 100 executes communication with one external terminal corresponding to the one graphic object such that the execution screen of the application is output from the external terminal. For instance, if the last touch input is moved to the second graphic object (B), the mobile terminal 100 can turn off the display unit 151a, and may execute communication with the second external terminal such that the execution screen of the application is output to the second external terminal corresponding to the second graphic object (B). With such a configuration, a user may select one external terminal which is to execute a task being executed in the mobile terminal in a consecutive manner, among the preset external terminals.

The mobile terminal 100 can further include the audio output unit 152 (refer to FIG. 1A) configured to output an audio signal related to the execution screen of the application. If a touch input satisfying a preset condition is applied while an audio signal is being output, the output of the audio signal is restricted. That is, the audio output unit 152 is controlled such that the audio signal is not output.

If a last touch input (LT) among touches included in the touch input satisfying a preset condition is maintained for a reference time, the display unit 151a of the mobile terminal 100 is turned off, and the execution screen of the application is output from the external terminal 900. The mobile terminal 100 can execute communication with the external terminal 900 such that the audio signal is output from the external terminal 900. That is, at least one of video information, audio information and tactile information which have been output from the mobile terminal 100, is consecutively output from the external terminal 900, rather than the mobile terminal 100.

When the display unit 151a is in an 'off' state, the mobile terminal 100 can execute communication with the external terminal 900 such that guidance information inquiring whether to execute a lock mode or not is output from the external terminal 900. The guidance information inquiring whether to execute a lock mode or not, indicates whether the mobile terminal 100 is in a locked state or a released state. The guidance information may be implemented as a text, an image, a video, etc.

Figure 9D:
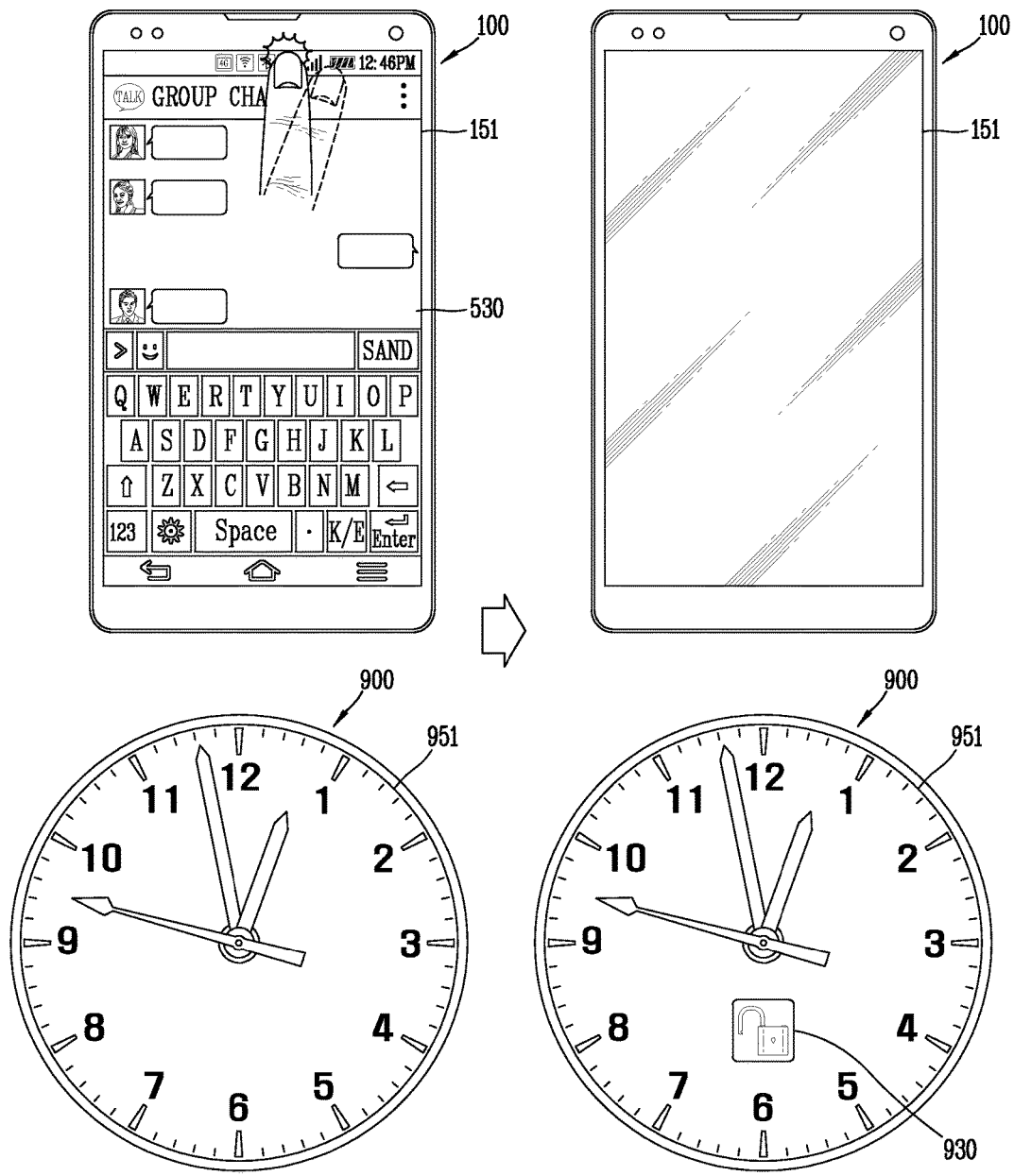

For instance, as shown in FIG. 9D, if a touch input satisfying a preset condition is input to a preset region of the execution screen 530, the mobile terminal 100 turns off the display unit 151a, but does not execute a lock mode. If the display unit 151a is turned off in a non-executed state of a lock mode, the mobile terminal 100 executes communication with the external terminal 900 such that the guidance information is output from the external terminal 900.

Figure 9E:
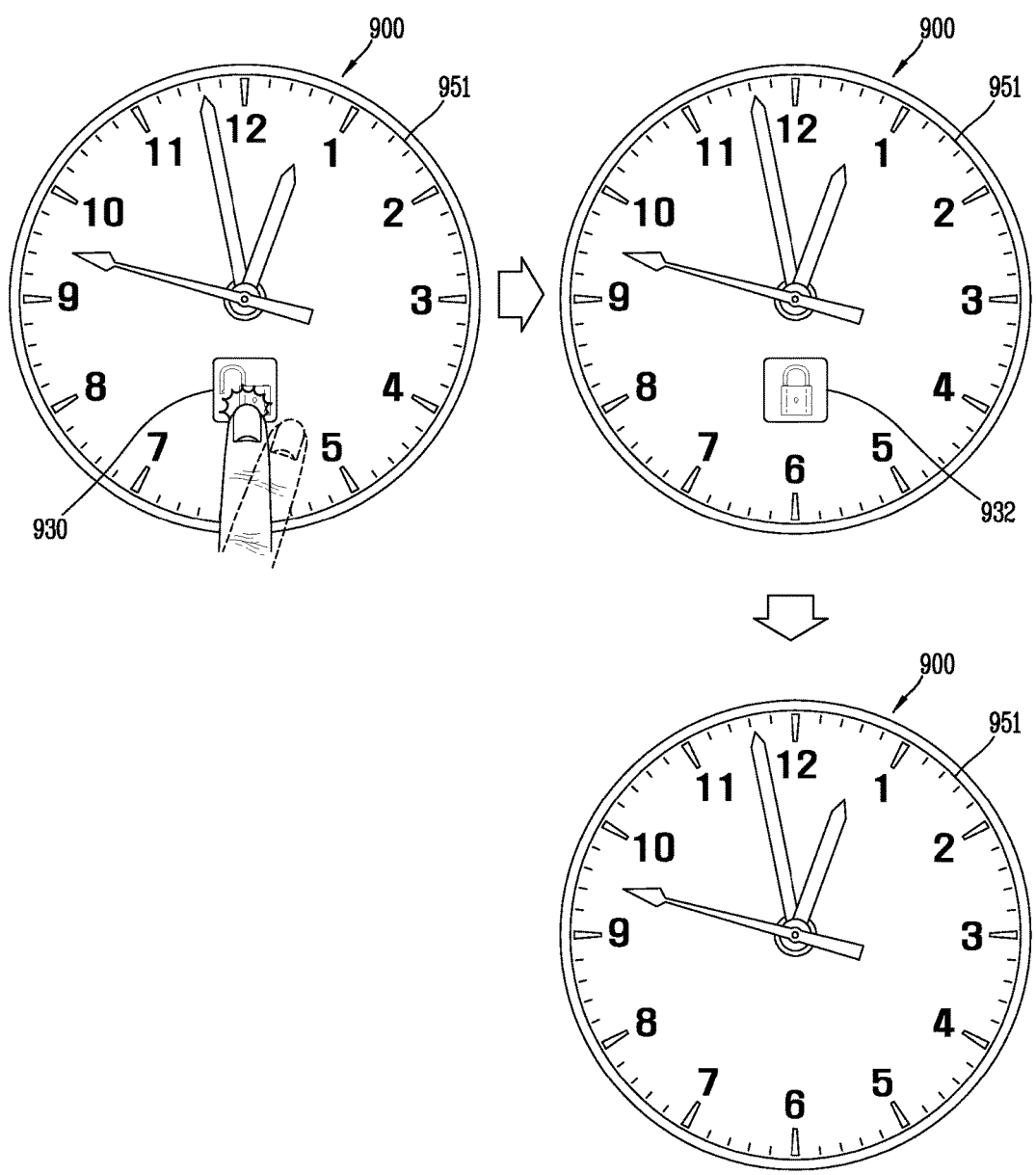

If the display unit 151a is turned off in a non-executed state of a lock mode, the external terminal 900 may output guidance information 930 indicating that the mobile terminal 100 is in a released state. With such a configuration, a user may check whether the mobile terminal 100 is in a locked state or not. The external terminal 900 may transmit a locking command to the mobile terminal 100 in response to a user's request. For instance, as shown in FIG. 9E, if a touch input is applied to the guidance information 930, the mobile terminal 100 can execute communication with the external terminal 900 so as to execute the lock mode.

If the mobile terminal 100 executes the lock mode in response to the locking command, the external terminal 900 may update the guidance information (930→932). Accordingly, a user may recognize that the mobile terminal 100 is in a lock mode. If the mobile terminal 100 is in the lock mode by the locking command, the external terminal 900 may terminate the output of the guidance information 932 after a predetermined time lapses. That is, the guidance information 932 disappears from the touch screen 951 of the external terminal 900.

Figure 10:
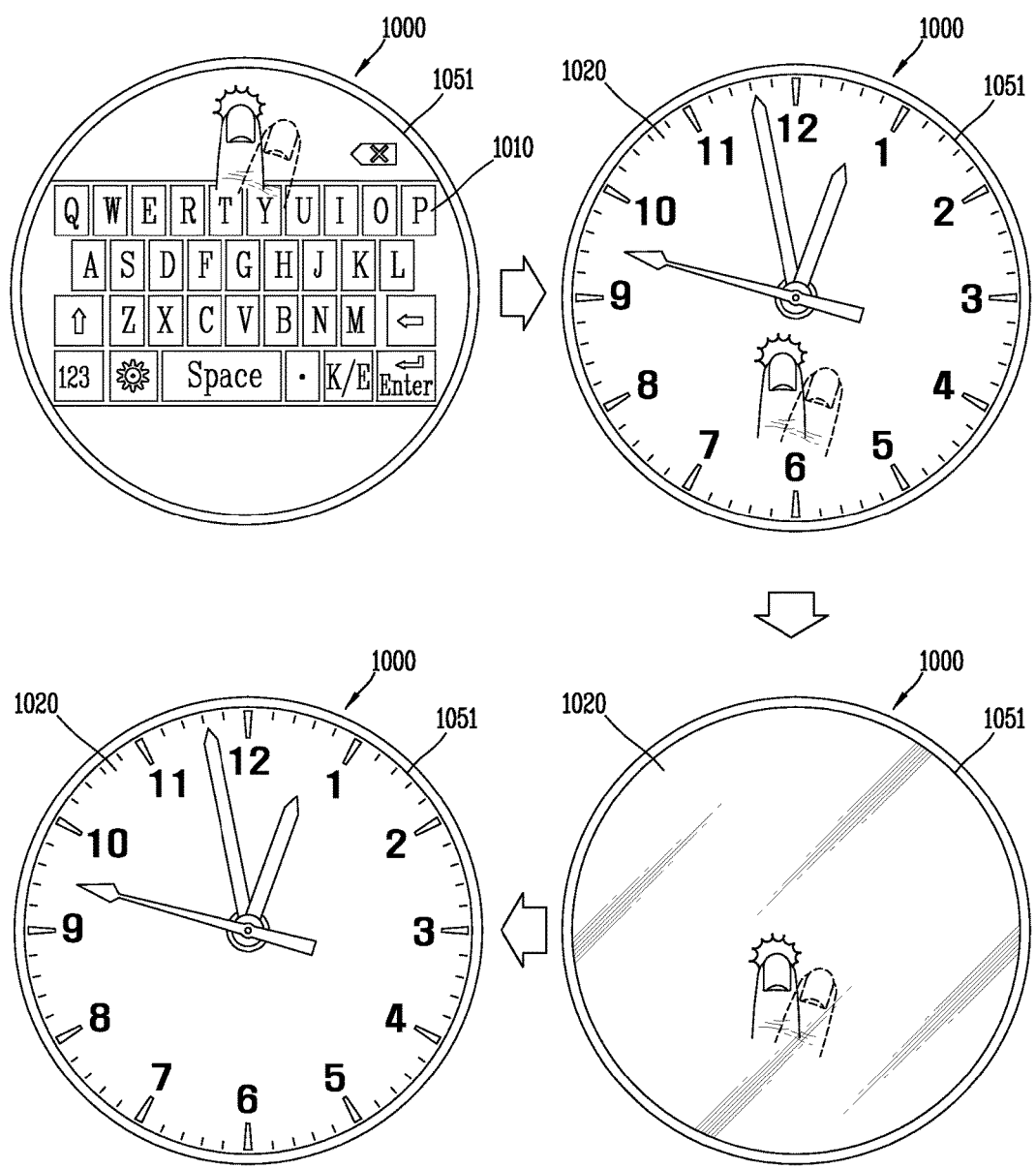
FIG. 10 is a conceptual view illustrating a case where the control method of FIG. 4 has been applied to a wearable device.

FIG. 10 is a conceptual view illustrating a case where the control method of FIG. 4 has been applied to a wearable device. The control method of FIG. 4 may be applied to a wearable device 1000 in a modified manner. If the control method of FIG. 4 is applied to the wearable device 1000, the home screen page is changed into a watch screen. Further, a lock mode is not executed at the wearable device 1000, since the wearable device 1000 cannot be worn by a third party.

The wearable device 1000 is configured to output the watch screen in a low power state. If a user does not use any mobile terminal, the bar-type mobile terminal 100 turns off the display unit for prevention of consumption of a battery. However, the wearable device 1000 outputs a watch screen without turning off a display unit.

With such a configuration, if the display unit of the wearable device 1000 is turned on, the wearable device 1000 controls a touch screen 1051 such that the watch screen or an execution screen by execution of an application is output. Further, if a plurality of touch inputs are consecutively received on a preset region of the watch screen, the wearable device 1000 turns off the display unit. And if a plurality of touch inputs are consecutively received on a preset region of the execution screen, the wearable device 1000 controls the touch screen 1051 such that the watch screen is output.

For instance, as shown in FIG. 10, if a touch input satisfying a preset condition is applied to a preset region of the execution screen 1010 which has been output, the wearable device 1000 outputs the watch screen 1020, not the execution screen 1010. If a touch input satisfying a preset condition is applied to a preset region of the watch screen 1020 which has been output, the wearable device 1000 turns off the display unit. This can prevent disturbance of a user's sleep due to light of the watch screen 1020. If a touch input satisfying a preset condition is applied to the touch screen 1051 in an 'off' state of the display unit, the wearable device 1000 controls the touch screen 1051 such that the watch screen 1020 is output again.

Figure 11:
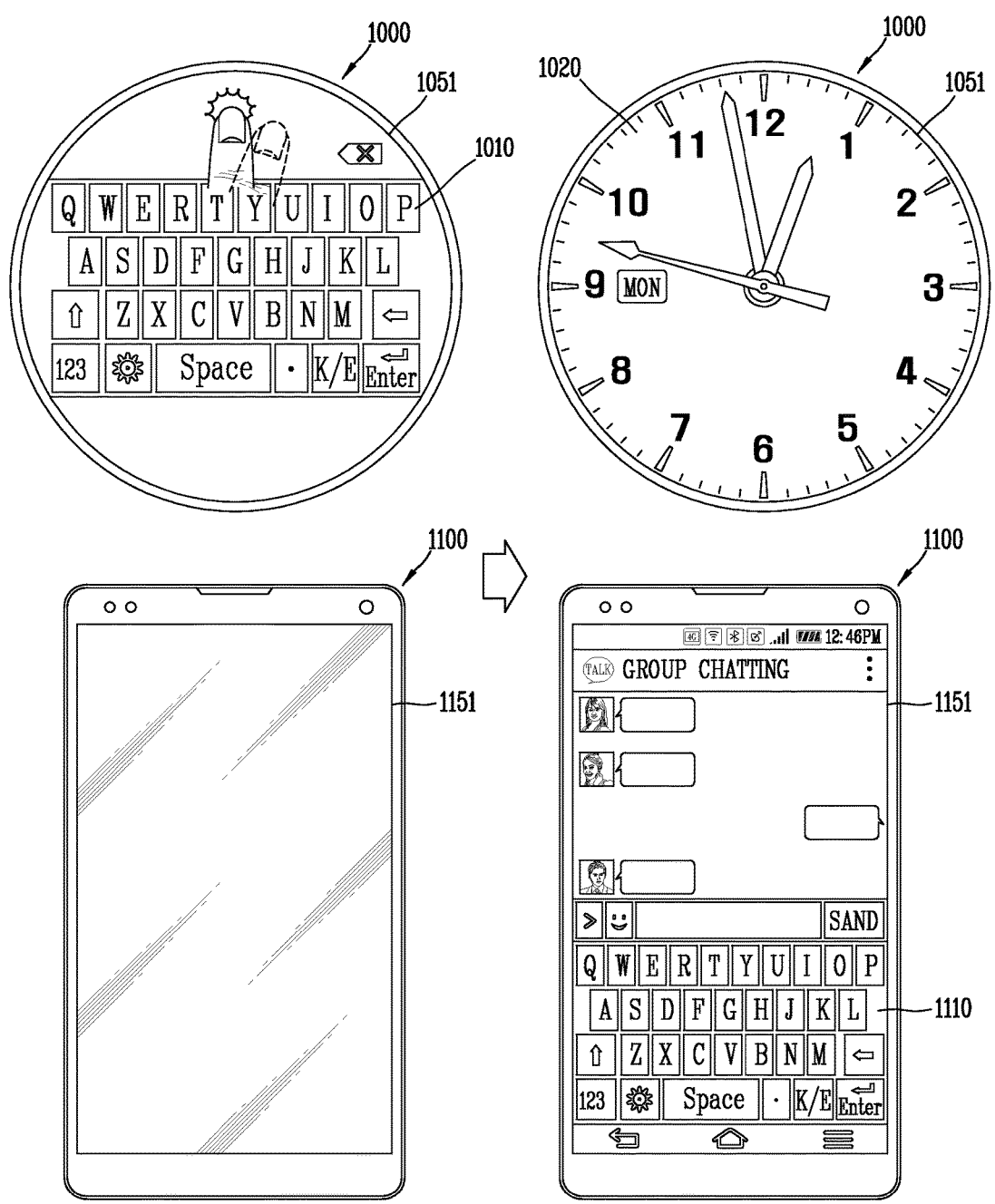
FIG. 11 is a conceptual view illustrating an example where a wearable device and an external terminal are interworked with each other.

FIG. 11 is a conceptual view illustrating an example where a wearable device and an external terminal are interworked with each other. Referring to FIG. 11, the wearable device 1000 may output the execution screen 1010 by execution of an application, to the touch screen 1051. If a touch input satisfying a preset condition is applied to a preset region of the execution screen 1010, and if a last touch input is maintained for a reference time without being released, the wearable device 1000 controls the touch screen 1051 such that the watch screen 1020 rather than the execution screen 1010 is output. Further, the wearable device 1000 may execute communication with a preset external terminal 1100 such that the execution screen 1010 is output from the preset external terminal 1100.

The mobile terminal and the control method thereof according to an embodiment of the present invention produces the following advantages. Firstly, the display unit can be turned off based on a touch input applied to the touch screen, and a lock mode can be selectively executed according to the touch input. Since a user executes or does not execute a lock mode in a simple manner, a user's convenience can be enhanced.

Secondly, a user can predict a time to re-use the mobile terminal, and can input a touch input corresponding to the predicted time to the mobile terminal such that the lock mode is automatically executed when the predicted time lapses. Thirdly, the mobile terminal can provide an interface for a user to consecutively execute a task being executed in the mobile terminal, in a preset external terminal. In this instance, output from the mobile terminal can be stopped or terminated such that unnecessary consumption of a battery of the mobile terminal is prevented.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
   a body;
   a touch screen disposed on a front surface of the body, and having a touch panel and a display unit; and
   a controller configured to:
   display a home screen page or an application execution screen on the touch screen in response to the display unit being turned on,
   turn off the display unit and execute a lock mode requiring input of a password, in response to a plurality of touch inputs being consecutively received on a preset region of the home screen page, and
   turn off the display unit and not execute the lock mode, in response to a plurality of touch inputs being consecutively received on a preset region of the application execution screen,
   wherein the plurality of touch inputs received on the preset region of the application execution screen include a first touch input and a second touch input,
   wherein the controller is further configured to:
   determine a time interval during which no touch is applied between the first touch input and the second touch input when the display unit is turned off and the lock mode is not executed according to the plurality of touch inputs received on the preset region of the application execution screen,
   set an automatic locking time based on the time interval, and
   execute the lock mode while keeping the display unit off when the automatic locking time elapses after the display unit is turned off, and
   wherein a first automatic locking time is set when the time interval satisfies a first condition and a second automatic locking time different from the first automatic locking time is set when the time interval satisfies a second condition.

2. The mobile terminal of claim 1, wherein the touch panel is configured to sense a touch input applied to the touch screen, regardless of an 'on/off' state of the display unit, and
   wherein the controller is configured to display a lock screen on the display unit to input a password, in response to a plurality of touch inputs being consecutively received on the touch screen in an 'off' state of the display unit and in an executed state of the lock mode.

3. The mobile terminal of claim 2, wherein the controller is configured to display the application execution screen on the display unit, in response to the plurality of touch inputs being consecutively received on the touch screen in an 'off' state of the display unit and in a non-executed state of the lock mode.

4. The mobile terminal of claim 2, wherein the controller is configured to display different screen information on the display unit based on an applied position of a plurality of touch inputs, in response to the plurality of touch inputs being consecutively received on the touch screen in an 'off' state of the display unit and in a non-executed state of the lock mode.

5. The mobile terminal of claim 1, further comprising:
   a proximity sensor disposed on a front surface of the body, and configured to sense an object disposed near the front surface of the body,
   wherein the controller is configured to execute the lock mode when the object is sensed in an 'off' state of the display unit and in a non-executed state of the lock mode.

6. The mobile terminal of claim 1, further comprising:
   a sensing unit configured to sense a movement of the body,
   wherein the controller is configured to execute the lock mode, in response to a preset movement of the body being sensed in an 'off' state of the display unit and in a non-executed state of the lock mode.

7. The mobile terminal of claim 1, further comprising:
   a wireless communication unit mounted to the body, and configured to transceive data with a preset external terminal,
   wherein the controller is configured to turn off the display unit and not execute the lock mode, and to communicate with the external terminal such that the application execution screen is output from the external terminal, in response to the plurality of touch inputs being consecutively received on the preset region of the execution screen, and a last touch input being maintained for a reference time without being released.

8. The mobile terminal of claim 7, further comprising:
   an audio output unit mounted to the body, and configured to output an audio signal related to the application execution screen,
   wherein the controller is configured to restrict the output of the audio signal, in response to the plurality of touch inputs being consecutively received on the preset region of the application execution screen, and the last touch input being maintained for the reference time without being released.

9. The mobile terminal of claim 8, wherein the controller is configured to communicate with the external terminal such that the audio signal is output from the external terminal, in response to the plurality of touch inputs being consecutively received on the preset region of the application execution screen, and the last touch input being maintained for the reference time without being released.

10. The mobile terminal of claim 1, further comprising:
a wireless communication unit mounted to the body, and configured to transceive data with a preset external terminal,
wherein the controller is configured to communicate with the external terminal such that guidance information inquiring whether to execute the lock mode or not is output from the external terminal in response to the display unit being turned off.

11. The mobile terminal of claim 10, wherein the controller is configured to execute the lock mode, in response to a locking command being received from the external terminal.

12. The mobile terminal of claim 1, wherein the preset region of the application execution screen is positioned near an upper end of the touch screen, and corresponds to a region where at least one of antenna information, time information and battery information is displayed.

13. The mobile terminal of claim 12, wherein an entire region of the home screen page is divided into a region where a graphic object related to a control function is displayed, and a region where the graphic object is not displayed, and
wherein the preset region of the home screen page corresponds to a region where the graphic object is not displayed.

* * * * *